(12) United States Patent
Islam et al.

(10) Patent No.: US 12,289,787 B2
(45) Date of Patent: *Apr. 29, 2025

(54) BEAM SWEEPING DURING AN ON-PERIOD OF A DRX CYCLE

(71) Applicant: QUALCOMM Incorporated, San Diego, CA (US)

(72) Inventors: Muhammad Nazmul Islam, Littleton, MA (US); Tao Luo, San Diego, CA (US); Wooseok Nam, San Diego, CA (US); Junyi Li, Fairless Hills, PA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

This patent is subject to a terminal disclaimer.

(21) Appl. No.: 17/572,311

(22) Filed: Jan. 10, 2022

(65) Prior Publication Data

US 2022/0210865 A1 Jun. 30, 2022

Related U.S. Application Data

(63) Continuation of application No. 16/387,853, filed on Apr. 18, 2019, now Pat. No. 11,224,088.

(60) Provisional application No. 62/693,233, filed on Jul. 2, 2018.

(51) Int. Cl.
*H04W 76/28* (2018.01)
*H04B 7/06* (2006.01)

(52) U.S. Cl.
CPC .......... *H04W 76/28* (2018.02); *H04B 7/0617* (2013.01)

(58) Field of Classification Search
CPC . H04W 16/28; H04W 52/0216; H04W 76/28; Y02D 30/70; H04B 7/0617; H04B 7/0695; H04B 7/088
See application file for complete search history.

(56) References Cited

U.S. PATENT DOCUMENTS 9,872,252 B1* 1/2018 Ang ...................... H04W 72/20
10,945,268 B2 3/2021 Li et al.
(Continued)

FOREIGN PATENT DOCUMENTS

WO WO-2018025070 A1 2/2018

OTHER PUBLICATIONS

International Preliminary Report on Patentability—PCT/US2019/035220, The International Bureau of WIPO—Geneva, Switzerland, Jan. 14, 2021 (184008WO).
(Continued)

*Primary Examiner* — Dung B Huynh
(74) *Attorney, Agent, or Firm* — Holland & Hart LLP

(57) ABSTRACT

Techniques are described herein for periodically transmitting a first set of signals (e.g., reference signals) during an on-period of a discontinuous reception (DRX) cycle rather than during an off-period of the DRX cycle. Such techniques may enable a user equipment (UE) operating in a DRX mode to conserve additional power during the DRX cycle. A periodicity for transmitting the first set of signals during the on-period may be determined. The periodicity may indicate that every one-in-N DRX cycles, the first set of signals are to be transmitted during the on-period. During other DRX cycles, the first set of signals may be transmitted during the off-period. When the first set of signals are transmitted during the on-period, the UE may refrain from activating certain components during the off-period, thereby conserving power.

30 Claims, 18 Drawing Sheets

(56) References Cited

U.S. PATENT DOCUMENTS

| | | | |
|---|---|---|---|
| 11,224,088 B2 | 1/2022 | Islam et al. | |
| 11,277,301 B2* | 3/2022 | Zhou | H04W 72/23 |
| 11,729,856 B2* | 8/2023 | Islam | H04W 76/28 370/329 |
| 12,075,354 B2* | 8/2024 | Tang | H04W 52/28 |
| 2008/0311932 A1 | 12/2008 | Kuo | |
| 2009/0247172 A1 | 10/2009 | Palanki et al. | |
| 2010/0255790 A1 | 10/2010 | Farajidana et al. | |
| 2012/0188903 A1 | 7/2012 | Futaki | |
| 2012/0275366 A1* | 11/2012 | Anderson | H04W 52/0219 370/311 |
| 2013/0148571 A1 | 6/2013 | Miller | |
| 2014/0198696 A1 | 7/2014 | Li et al. | |
| 2015/0009951 A1 | 1/2015 | Josiam et al. | |
| 2015/0036574 A1* | 2/2015 | Uemura | H04W 52/0229 370/311 |
| 2015/0078189 A1 | 3/2015 | Kwon et al. | |
| 2015/0282247 A1* | 10/2015 | Batchu | H04W 56/003 370/311 |
| 2016/0014697 A1 | 1/2016 | Mujtaba et al. | |
| 2016/0066296 A1* | 3/2016 | Su | H04W 64/003 455/458 |
| 2016/0073306 A1 | 3/2016 | Yang et al. | |
| 2016/0174189 A1* | 6/2016 | Yoshizawa | H04W 76/28 455/458 |
| 2016/0192433 A1 | 6/2016 | Deenoo et al. | |
| 2017/0019931 A1 | 1/2017 | Su et al. | |
| 2017/0127398 A1 | 5/2017 | Andgart et al. | |
| 2017/0134964 A1 | 5/2017 | Yu et al. | |
| 2017/0164308 A1 | 6/2017 | Ji et al. | |
| 2017/0195163 A1 | 7/2017 | Chae et al. | |
| 2017/0207845 A1 | 7/2017 | Moon et al. | |
| 2017/0251518 A1* | 8/2017 | Agiwal | H04W 76/28 |
| 2017/0273062 A1 | 9/2017 | Liu et al. | |
| 2017/0311276 A1 | 10/2017 | Tsai et al. | |
| 2017/0339641 A1 | 11/2017 | Nigam et al. | |
| 2017/0339675 A1 | 11/2017 | Liu et al. | |
| 2017/0339681 A1 | 11/2017 | Hussain et al. | |
| 2017/0339744 A1 | 11/2017 | Latheef et al. | |
| 2017/0366236 A1 | 12/2017 | Ryoo et al. | |
| 2017/0367069 A1 | 12/2017 | Agiwal et al. | |
| 2018/0026698 A1 | 1/2018 | Lee et al. | |
| 2018/0027522 A1 | 1/2018 | Lee et al. | |
| 2018/0035372 A1 | 2/2018 | Pradas et al. | |
| 2018/0062717 A1 | 3/2018 | Mok et al. | |
| 2018/0070406 A1 | 3/2018 | Chen et al. | |
| 2018/0077680 A1 | 3/2018 | Tenny et al. | |
| 2018/0098287 A1* | 4/2018 | Ang | H04W 52/0229 |
| 2018/0109303 A1 | 4/2018 | Yoo et al. | |
| 2018/0132217 A1* | 5/2018 | Stirling-Gallacher | H04L 5/0053 |
| 2018/0132275 A1 | 5/2018 | Azarian Yazdi et al. | |
| 2018/0132292 A1 | 5/2018 | Yang et al. | |
| 2018/0167946 A1 | 6/2018 | Si et al. | |
| 2018/0220288 A1* | 8/2018 | Agiwal | H04W 4/30 |
| 2018/0279204 A1 | 9/2018 | Kim et al. | |
| 2018/0288737 A1 | 10/2018 | Islam | |
| 2018/0288757 A1* | 10/2018 | Sun | H04B 7/088 |
| 2018/0368103 A1 | 12/2018 | Zhou | |
| 2019/0007844 A1 | 1/2019 | Muller et al. | |
| 2019/0037498 A1* | 1/2019 | Tseng | H04W 72/046 |
| 2019/0045481 A1 | 2/2019 | Sang et al. | |
| 2019/0053162 A1* | 2/2019 | Islam | H04W 52/0229 |
| 2019/0053321 A1 | 2/2019 | Islam et al. | |
| 2019/0058518 A1 | 2/2019 | Koskela et al. | |
| 2019/0059056 A1* | 2/2019 | Islam | H04L 1/00 |
| 2019/0059129 A1 | 2/2019 | Luo et al. | |
| 2019/0069192 A1* | 2/2019 | Palenius | H04W 24/10 |
| 2019/0074890 A1 | 3/2019 | Chang et al. | |
| 2019/0182794 A1* | 6/2019 | Wong | H04W 52/0216 |
| 2019/0182800 A1 | 6/2019 | Park et al. | |
| 2019/0190570 A1 | 6/2019 | Yan et al. | |
| 2019/0223065 A1 | 7/2019 | Lu et al. | |
| 2019/0223162 A1 | 7/2019 | Suzuki et al. | |
| 2019/0254078 A1 | 8/2019 | Zhang | |
| 2019/0254110 A1* | 8/2019 | He | H04L 41/0896 |
| 2019/0261287 A1 | 8/2019 | Deenoo et al. | |
| 2019/0261448 A1* | 8/2019 | Hu | H04W 24/10 |
| 2019/0268931 A1 | 8/2019 | He et al. | |
| 2019/0289662 A1 | 9/2019 | Ishikura et al. | |
| 2019/0297577 A1 | 9/2019 | Lin et al. | |
| 2019/0313409 A1 | 10/2019 | Tian et al. | |
| 2019/0319686 A1 | 10/2019 | Chen, IV et al. | |
| 2019/0334604 A1* | 10/2019 | Kusano | H04L 5/0023 |
| 2019/0335528 A1 | 10/2019 | Bin Sediq | |
| 2019/0342822 A1 | 11/2019 | Ohara et al. | |
| 2019/0342925 A1 | 11/2019 | Zhang et al. | |
| 2019/0349960 A1 | 11/2019 | Li et al. | |
| 2019/0350038 A1 | 11/2019 | Li et al. | |
| 2019/0356379 A1 | 11/2019 | Takeda et al. | |
| 2019/0373577 A1 | 12/2019 | Agiwal | |
| 2019/0387572 A1* | 12/2019 | Nam | H04W 8/24 |
| 2020/0008261 A1 | 1/2020 | Islam et al. | |
| 2020/0014453 A1 | 1/2020 | Takeda et al. | |
| 2020/0015313 A1 | 1/2020 | Reial et al. | |
| 2020/0022040 A1 | 1/2020 | Chen et al. | |
| 2020/0022067 A1 | 1/2020 | Pan et al. | |
| 2020/0029302 A1 | 1/2020 | Cox et al. | |
| 2020/0036430 A1* | 1/2020 | Kim | H04W 76/28 |
| 2020/0037247 A1* | 1/2020 | Liao | H04W 52/0216 |
| 2020/0037274 A1 | 1/2020 | Pan et al. | |
| 2020/0045684 A1 | 2/2020 | Futaki | |
| 2020/0045725 A1* | 2/2020 | Mochizuki | H04W 72/23 |
| 2020/0059862 A1 | 2/2020 | Wong et al. | |
| 2020/0067685 A1 | 2/2020 | Awad et al. | |
| 2020/0068526 A1 | 2/2020 | Ji et al. | |
| 2020/0092846 A1 | 3/2020 | Deng et al. | |
| 2020/0092923 A1 | 3/2020 | Abraham et al. | |
| 2020/0120602 A1* | 4/2020 | Geng | H04W 72/044 |
| 2020/0145079 A1 | 5/2020 | Marinier et al. | |
| 2020/0145921 A1* | 5/2020 | Zhang | H04W 52/0235 |
| 2020/0163048 A1 | 5/2020 | Kim et al. | |
| 2020/0186312 A1* | 6/2020 | Mochizuki | H04W 72/23 |
| 2020/0205076 A1* | 6/2020 | Chen | H04W 52/02 |
| 2020/0205218 A1 | 6/2020 | Tang | |
| 2020/0221416 A1 | 7/2020 | Wong et al. | |
| 2020/0229092 A1 | 7/2020 | Wu et al. | |
| 2020/0229093 A1 | 7/2020 | Ahmad et al. | |
| 2020/0244413 A1 | 7/2020 | Takeda et al. | |
| 2020/0252119 A1* | 8/2020 | Lee | H04L 5/0048 |
| 2020/0275479 A1 | 8/2020 | Peisa et al. | |
| 2020/0366430 A1 | 11/2020 | Yu et al. | |
| 2020/0404620 A1* | 12/2020 | Sang | H04W 24/10 |
| 2021/0076448 A1* | 3/2021 | Koskela | H04B 7/0695 |
| 2021/0127355 A1* | 4/2021 | Gonzalez | H04W 68/02 |
| 2021/0195521 A1* | 6/2021 | Müller | H04W 76/28 |
| 2021/0235492 A1* | 7/2021 | Iyer | H04L 5/0092 |
| 2021/0243777 A1* | 8/2021 | Tsai | H04W 74/006 |
| 2022/0046540 A1* | 2/2022 | Kwon | H04W 52/0235 |
| 2022/0346075 A1* | 10/2022 | Wang | H04W 72/046 |
| 2022/0394614 A1* | 12/2022 | Hwang | H04L 1/1822 |
| 2023/0134552 A1* | 5/2023 | Kim | H04W 60/04 370/329 |
| 2023/0145663 A1* | 5/2023 | Kwon | H04L 5/0057 370/318 |
| 2023/0284148 A1* | 9/2023 | Huang | H04L 5/0053 370/318 |
| 2023/0300790 A1* | 9/2023 | Jung | H04W 48/12 370/329 |
| 2023/0328648 A1* | 10/2023 | Freda | H04W 52/0216 370/311 |
| 2023/0328841 A1* | 10/2023 | Ganesan | H04L 5/0023 370/330 |
| 2024/0015653 A1* | 1/2024 | He | H04W 76/28 |

OTHER PUBLICATIONS

International Search Report and Written Opinion—PCT/US2019/035220—ISA/EPO—Aug. 19, 2019 (184008WO).

National Taiwan University: "Beam Operation Impact for DRX in NR", 3GPP Draft; R2-1707396 DRX Beam Impact, 3rd Generation Partnership Project (3GPP), Mobile Competence Centre, 650, Route

(56) References Cited

OTHER PUBLICATIONS

Des Lucioles, F-06921 Sophia-Antipolis Cedex, France vol. Ran WG2 No. Qingdao, China; Jun. 27, 2017-Jun. 29, 2017 Jun. 26, 2017, XP051301885, Retrieved from the Internet: URL:http://www.3gpp.org/ftp/Meetings_3GPP_SYNC/RAN2/Docs/ [retrieved on Jun. 26, 2017], 5 pages.

Qualcomm Incorporated: "Beam Management in C-DRX", 3GPP Draft; R2-1803030—Beam Management in C-DRX, 3rd Generation Partnership Project (3GPP), Mobile Competence Centre, 650, Route Des Lucioles, F-06921 Sophia-Antipolis Cedex, France vol. RAN WG2, No. Athens, Greece; Feb. 26, 2018-Mar. 2, 2018 Feb. 15, 2018, XP051399648, Retrieved from the Internet:URL:http://www.3gpp.org/ftp/tsg%5Fran/WG2%5FRL2/TSGR2%5F101/Docs/ [retrieved on Feb. 15, 2018], 3 pages.

Qualcomm: "Wakeup Signaling for Multi-Beam Systems", 3GPP Draft; R2-1711703 Wakeup Signaling for Multi-Beam Systems, 3rd Generation Partnership Project (3GPP), Mobile Competence Centre, 650, Route Des Lucioles, F-06921 Sophia-Antipolis Cedex, France vol. RAN WG2, No. Prague, Czech; Oct. 9, 2017-Oct. 13, 2017 Oct. 8, 2017, XP051343661, Retrieved from the Internet: URL:http://www.3gpp.org/ftp/Meetings_3GPP_SYNC/RAN2/Docs/ [retrieved on Oct. 8, 2017], 4 pages.

Samsung: "Discussion on C-DRX Enhancement considering Beamforming", 3GPP Draft; R2-1806055 Discussion on C-DRX Enhancement considering Beamforming, 3rd Generation Partnership Project (3GPP), Mobile Competence Centre, 650, Route Des Lucioles, F-06921 Sophia-Antipolis Cedex, France vol. RAN WG2, No. Sanya, China; Apr. 16, 2018-Apr. 20, 2018 Apr. 14, 2018, XP051429641, Retrieved from the Internet:URL:http://www.3gpp.org/ftp/Meetings%5F3GPP%5FSYNC/RAN2/Docs/ [retrieved on Apr. 14, 2018], 4 pages.

Ericsson: "Drx with Short On-Duration and Wake-Up Signaling", 3GPP TSG-RAN WG2 #98-AH, R2-1707124, 3rd Generation Partnership Project (3GPP), Mobile Competence Centre, 650, Route Des Lucioles, F-06921, Sophia-Antipolis Cede, vol. RAN WG2, No. Qingdao, Jun. 27, 2017-Jun. 29, 2017, Jun. 26, 2017, pp. 1-3, XP051301617.

Qualcomm Incorporated., et al., "Wake-Up Signaling for CDRX Mode", 3GPP TSG RAN WG2 NR #99, R2-1709649, 3rd Generation Partnership Project (3GPP), Mobile Competence Centre, 650, Route Des Lucioles, F-06921, Sophia-Antipolis Cedex, France, vol. RAN WG2, No. Berlin, Germany, Aug. 21, 2017-Aug. 25, 2017, Aug. 20, 2017, pp. 1-5, XP051319363.

Samsung: "Discussion on Wake up Signal Configuration", 3GPP TSG RAN WG1 Meeting 91, R1-1720264, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 18, 2017, 5 Pages, XP051369895.

* cited by examiner

BEAM SWEEPING DURING AN ON-PERIOD OF A DRX CYCLE

CROSS REFERENCE

The present Application for Patent is a Continuation of U.S. patent application Ser. No. 16/387,853 by ISLAM et al., entitled "Beam Sweeping During An On-Period of DRX Cycle" filed Apr. 18, 2019, now U.S. Pat. No. 11,224,088, which claims the benefit of U.S. Provisional Patent Application No. 62/693,233 by Islam et al., entitled "Beam Sweeping During An On-Period of a DRX Cycle," filed Jul. 2, 2018, each of which is assigned to the assignee hereof, and expressly incorporated by reference herein.

BACKGROUND

The following relates generally to wireless communications, and more specifically to beam sweeping during an on-period of a discontinuous reception (DRX) cycle.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may enter a DRX mode to conserve power. Beam management procedures may be executed while the UE is operating in the DRX mode to maintain a communication link.

SUMMARY

The described techniques relate to improved methods, systems, devices, and apparatuses that support beam sweeping during an on-period of a DRX cycle. Generally, the described techniques provide for periodically transmitting a first set of signals (e.g., reference signals) during an on-period of a discontinuous reception (DRX) cycle rather than during an off-period of the DRX cycle. Such techniques may enable a user equipment (UE) operating in a DRX mode to conserve additional power during the DRX cycle. A periodicity for transmitting the first set of signals during the on-period may be determined. The periodicity may indicate that every one-in-N DRX cycles, the first set of signals are to be transmitted during the on-period. During other DRX cycles, the first set of signals may be transmitted during the off-period. When the first set of signals are transmitted during the on-period, the UE may refrain from activating certain components during the off-period, thereby conserving power.

A method of wireless communication is described. The method may include transmitting, to a UE operating in a DRX mode, a first set of signals using a first set of beams during a first on-period of a first DRX cycle associated with the UE and transmitting, to the UE, a second set of wake-up signals using a second set of beams during a second on-period of a second DRX cycle associated with the UE, the second on-period being different from the first on-period.

An apparatus for wireless communication is described. The apparatus may include a processor, memory in electronic communication with the processor, and instructions stored in the memory. The instructions may be executable by the processor to cause the apparatus to transmit, to a UE operating in a DRX mode, a first set of signals using a first set of beams during a first on-period of a first DRX cycle associated with the UE and transmit, to the UE, a second set of wake-up signals using a second set of beams during a second on-period of a second DRX cycle associated with the UE, the second on-period being different from the first on-period.

Another apparatus for wireless communication is described. The apparatus may include means for transmitting, to a UE operating in a DRX mode, a first set of signals using a first set of beams during a first on-period of a first DRX cycle associated with the UE and transmitting, to the UE, a second set of wake-up signals using a second set of beams during a second on-period of a second DRX cycle associated with the UE, the second on-period being different from the first on-period.

A non-transitory computer-readable medium storing code for wireless communication is described. The code may include instructions executable by a processor to transmit, to a UE operating in a DRX mode, a first set of signals using a first set of beams during a first on-period of a first DRX cycle associated with the UE and transmit, to the UE, a second set of wake-up signals using a second set of beams during a second on-period of a second DRX cycle associated with the UE, the second on-period being different from the first on-period.

Some examples of the method, apparatuses, and non-transitory computer-readable medium described herein may further include operations, features, means, or instructions for receiving, from the UE, status information about the UE, where transmitting the first set of signals may be based on receiving the status information.

Some examples of the method, apparatuses, and non-transitory computer-readable medium described herein may further include operations, features, means, or instructions for identifying a periodicity of the first set of signals and the second set of wake-up signals based on receiving the status information.

In some examples of the method, apparatuses, and non-transitory computer-readable medium described herein, receiving the status information further may include operations, features, means, or instructions for receiving battery status information from the UE.

In some examples of the method, apparatuses, and non-transitory computer-readable medium described herein, the first set of signals may be transmitted once in every N DRX on-periods. In some examples of the method, apparatuses, and non-transitory computer-readable medium described herein, the second set of signals are transmitted during the remaining non-N on-periods.

Some examples of the method, apparatuses, and non-transitory computer-readable medium described herein may further include operations, features, means, or instructions for randomizing an order of the first set of beams transmitted during the first on-period of the first DRX cycle across one or more cells, where transmitting the first set of signals may be based on randomizing the order.

In some examples of the method, apparatuses, and non-transitory computer-readable medium described herein, randomization of the first set of beams may be based on a cell identifier, a UE identifier, or a UE group identifier, or a combination thereof.

Some examples of the method, apparatuses, and non-transitory computer-readable medium described herein may further include operations, features, means, or instructions for refraining from transmitting the first set of signals during an off-period of the first DRX cycle based on transmitting the first set of signals during the first on-period of the first DRX cycle.

Some examples of the method, apparatuses, and non-transitory computer-readable medium described herein may further include operations, features, means, or instructions for transmitting the first set of signals once in every M DRX off-periods based at least in part on transmitting the second set of wake up signals during the second on-period of the second DRX cycle. In some examples of the method, apparatuses, and non-transitory computer-readable medium described herein, a value of M is one.

Some examples of the method, apparatuses, and non-transitory computer-readable medium described herein may further include operations, features, means, or instructions for refraining from transmitting the first set of signals during an off-period adjacent the first on-period.

Some examples of the method, apparatuses, and non-transitory computer-readable medium described herein may further include operations, features, means, or instructions for transmitting the second set of wake-up signals during the first on-period of the first DRX cycle based on transmitting the first set of signals during the first on-period of the first DRX cycle.

Some examples of the method, apparatuses, and non-transitory computer-readable medium described herein may further include operations, features, means, or instructions for encoding wake-up information into at least one reference signal of the first set of signals transmitted during the first on-period of the first DRX cycle, where transmitting the first set of signals during the first on-period of the first DRX cycle may be based on encoding the wake-up information into the at least one reference signal.

Some examples of the method, apparatuses, and non-transitory computer-readable medium described herein may further include operations, features, means, or instructions for identifying the first DRX cycle as a DRX cycle where the first set of signals may be transmitted during an on-period of the DRX cycle, where transmitting the first set of signals may be based on identifying the first DRX cycle.

In some examples of the method, apparatuses, and non-transitory computer-readable medium described herein, the first set of signals are transmitted with a first set of gNB beams and the second set of signals are transmitted with a second set of gNB beams.

In some examples of the method, apparatuses, and non-transitory computer-readable medium described herein, the second set of beams may be a subset of the first set of beams.

In some examples of the method, apparatuses, and non-transitory computer-readable medium described herein, a number of beams in the first set of beams may be different from a number of beams in the second set of beams.

In some examples of the method, apparatuses, and non-transitory computer-readable medium described herein, the first set of signals includes channel state information reference signals (CSI-RSs), primary synchronization signals (PSSs), secondary synchronization signals (SSSs), demodulation reference signals (DMRSs) of physical broadcast channels (PBCHs), or tracking reference signals, or a combination thereof.

In some examples of the method, apparatuses, and non-transitory computer-readable medium described herein, the first set of signals includes a set of reference signals.

In some examples of the method, apparatuses, and non-transitory computer-readable medium described herein, the first set of signals includes a physical downlink control channel (PDCCH) with one or more CRC bits scrambled using a radio network temporary identifier (RNTI) associated with the UE.

In some examples of the method, apparatuses, and non-transitory computer-readable medium described herein, the UE may be in a connected discontinuous reception (C-DRX) mode.

A method of wireless communication is described. The method may include receiving, by a UE operating in a DRX mode, a first set of signals using a first set of beams during a first on-period of a first DRX cycle associated with the UE and receiving, by the UE, a second set of wake-up signals using a second set of beams during a second on-period of a second DRX cycle associated with the UE, the second on-period being different from the first on-period.

An apparatus for wireless communication is described. The apparatus may include a processor, memory in electronic communication with the processor, and instructions stored in the memory. The instructions may be executable by the processor to cause the apparatus to receive, by a UE operating in a DRX mode, a first set of signals using a first set of beams during a first on-period of a first DRX cycle associated with the UE and receive, by the UE, a second set of wake-up signals using a second set of beams during a second on-period of a second DRX cycle associated with the UE, the second on-period being different from the first on-period.

Another apparatus for wireless communication is described. The apparatus may include means for receiving, by a UE operating in a DRX mode, a first set of signals using a first set of beams during a first on-period of a first DRX cycle associated with the UE and receiving, by the UE, a second set of wake-up signals using a second set of beams during a second on-period of a second DRX cycle associated with the UE, the second on-period being different from the first on-period.

A non-transitory computer-readable medium storing code for wireless communication is described. The code may include instructions executable by a processor to receive, by a UE operating in a DRX mode, a first set of signals using a first set of beams during a first on-period of a first DRX cycle associated with the UE and receive, by the UE, a second set of wake-up signals using a second set of beams during a second on-period of a second DRX cycle associated with the UE, the second on-period being different from the first on-period.

Some examples of the method, apparatuses, and non-transitory computer-readable medium described herein may further include operations, features, means, or instructions for transmitting, by the UE, status information about the UE, where receiving the first set of signals may be based on transmitting the status information.

Some examples of the method, apparatuses, and non-transitory computer-readable medium described herein may further include operations, features, means, or instructions for identifying a periodicity of the first set of signals and the second set of wake-up signals based on transmitting the status information.

In some examples of the method, apparatuses, and non-transitory computer-readable medium described herein, transmitting the status information further may include operations, features, means, or instructions for transmitting battery status information to a base station.

In some examples of the method, apparatuses, and non-transitory computer-readable medium described herein, the first set of signals may be received once in every N DRX on-periods. In some examples of the method, apparatuses, and non-transitory computer-readable medium described herein, the second set of signals are received during the remaining non-N on-periods.

Some examples of the method, apparatuses, and non-transitory computer-readable medium described herein may further include operations, features, means, or instructions for receiving the first set of signals once in every M DRX off-periods based at least in part on receiving the second set of wake up signals during the second on-period of the second DRX cycle. In some examples of the method, apparatuses, and non-transitory computer-readable medium described herein, a value of M is one.

Some examples of the method, apparatuses, and non-transitory computer-readable medium described herein may further include operations, features, means, or instructions for receiving the second set of wake-up signals during the on-period of the first DRX cycle based on receiving the first set of signals during the on-period of the first DRX cycle.

Some examples of the method, apparatuses, and non-transitory computer-readable medium described herein may further include operations, features, means, or instructions for identifying wake-up information encoded in at least one reference signal of the first set of signals transmitted during the on-period of the first DRX cycle.

In some examples of the method, apparatuses, and non-transitory computer-readable medium described herein, the second set of beams may be a subset of the first set of beams.

In some examples of the method, apparatuses, and non-transitory computer-readable medium described herein, a number of beams in the first set of beams may be different from a number of beams in the second set of beams.

In some examples of the method, apparatuses, and non-transitory computer-readable medium described herein, the first set of signals includes a set of reference signals.

In some examples of the method, apparatuses, and non-transitory computer-readable medium described herein, the first set of signals includes a PDCCH with one or more CRC bits scrambled using a radio network temporary identifier (RNTI) associated with the UE.

In some examples of the method, apparatuses, and non-transitory computer-readable medium described herein, the first set of signals includes channel state information reference signals (CSI-RSs), primary synchronization signals (PSSs), secondary synchronization signals (SSSs), demodulation reference signals (DMRSs) of physical broadcast channels (PBCHs), or tracking reference signals, or a combination thereof.

In some examples of the method, apparatuses, and non-transitory computer-readable medium described herein, the UE may be in a connected discontinuous reception (C-DRX) mode.

DETAILED DESCRIPTION

In some wireless communications systems, a user equipment (UE) may enter a discontinuous reception (DRX) mode to conserve power. In wireless communications systems that use directional beams to establish communication links, the UE may perform beam management procedures while the UE is operating in the DRX mode. Such beam management procedures may consume power and may reduce the benefits to the UE for operating in the DRX mode.

Techniques are described herein for periodically transmitting a first set of signals (e.g., reference signals) during an on-period of a DRX cycle rather than during an off-period of the DRX cycle. Such techniques may enable a UE operating in a DRX mode to conserve additional power during the DRX cycle. A periodicity for transmitting the first set of signals during the on-period may be determined. The periodicity may indicate that every one-in-N DRX cycles, the first set of signals are to be transmitted during the on-period. During other DRX cycles, the first set of signals may be transmitted during the off-period. When the first set of signals are transmitted during the on-period, the UE may refrain from activating certain components during the off-period, thereby conserving power.

Aspects of the disclosure are initially described in the context of a wireless communications system. Aspects of the disclosure are described in the context of wireless communication systems and procedures. Aspects of the disclosure are further illustrated by and described with reference to apparatus diagrams, system diagrams, and flowcharts that relate to beam sweeping during an on-period of a DRX cycle.

Figure 1:
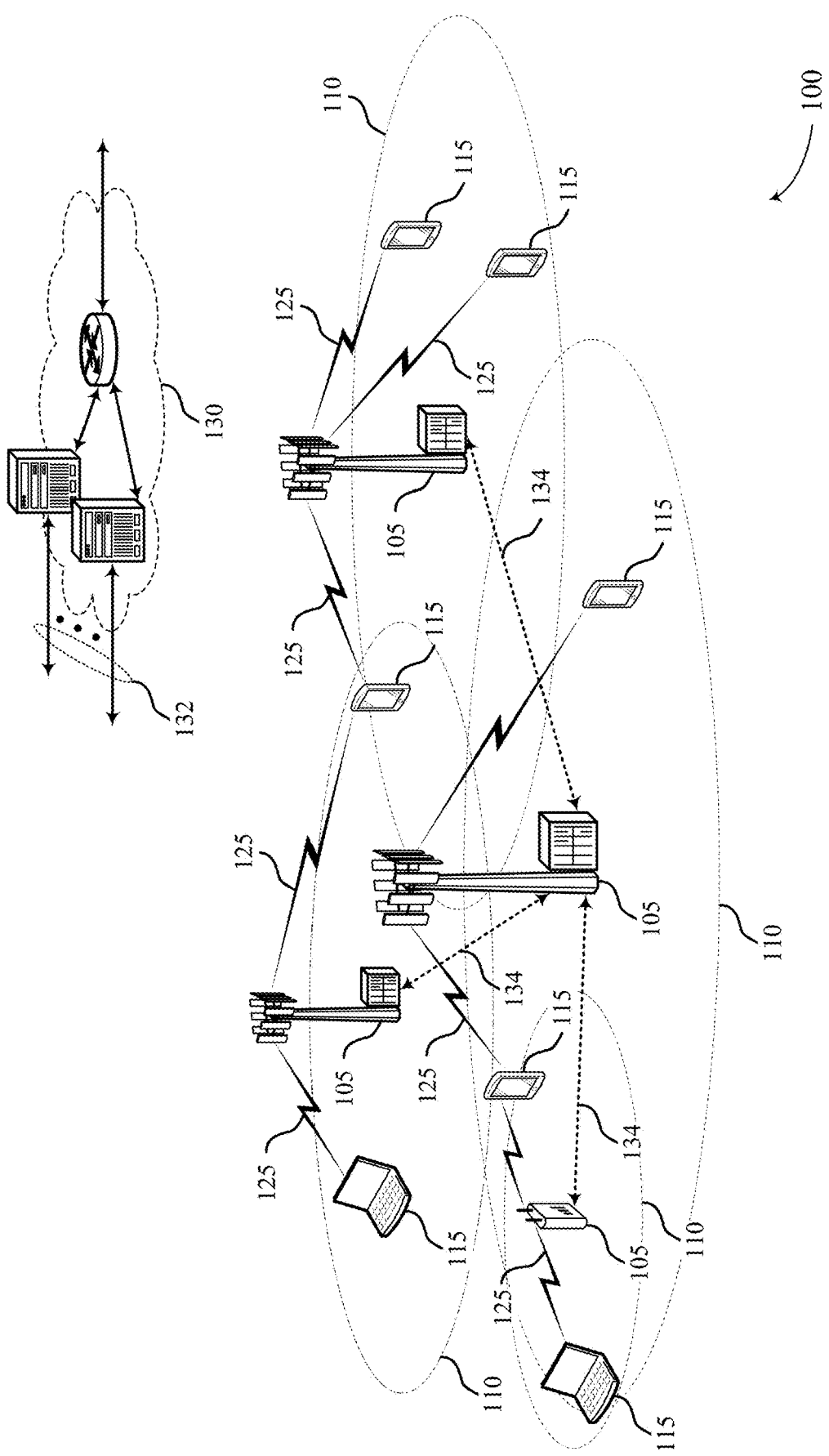
FIG. 1 illustrates an example of a wireless communications system that supports beam sweeping during an on-period of a discontinuous reception (DRX) cycle in accordance with aspects of the present disclosure.

FIG. 1 illustrates an example of a wireless communications system 100 that supports beam sweeping during an on-period of a DRX cycle in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved UTRA (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a base station 105 may periodically transmit a first set of signals (e.g., reference signals) during an on-period of a DRX cycle. By periodically transmitting during the on-period, the UE 115 may not listen during the corresponding off-period of the same DRX cycle, thereby allowing the UE 115 to conserve power while operating the DRX mode.

Figure 2:
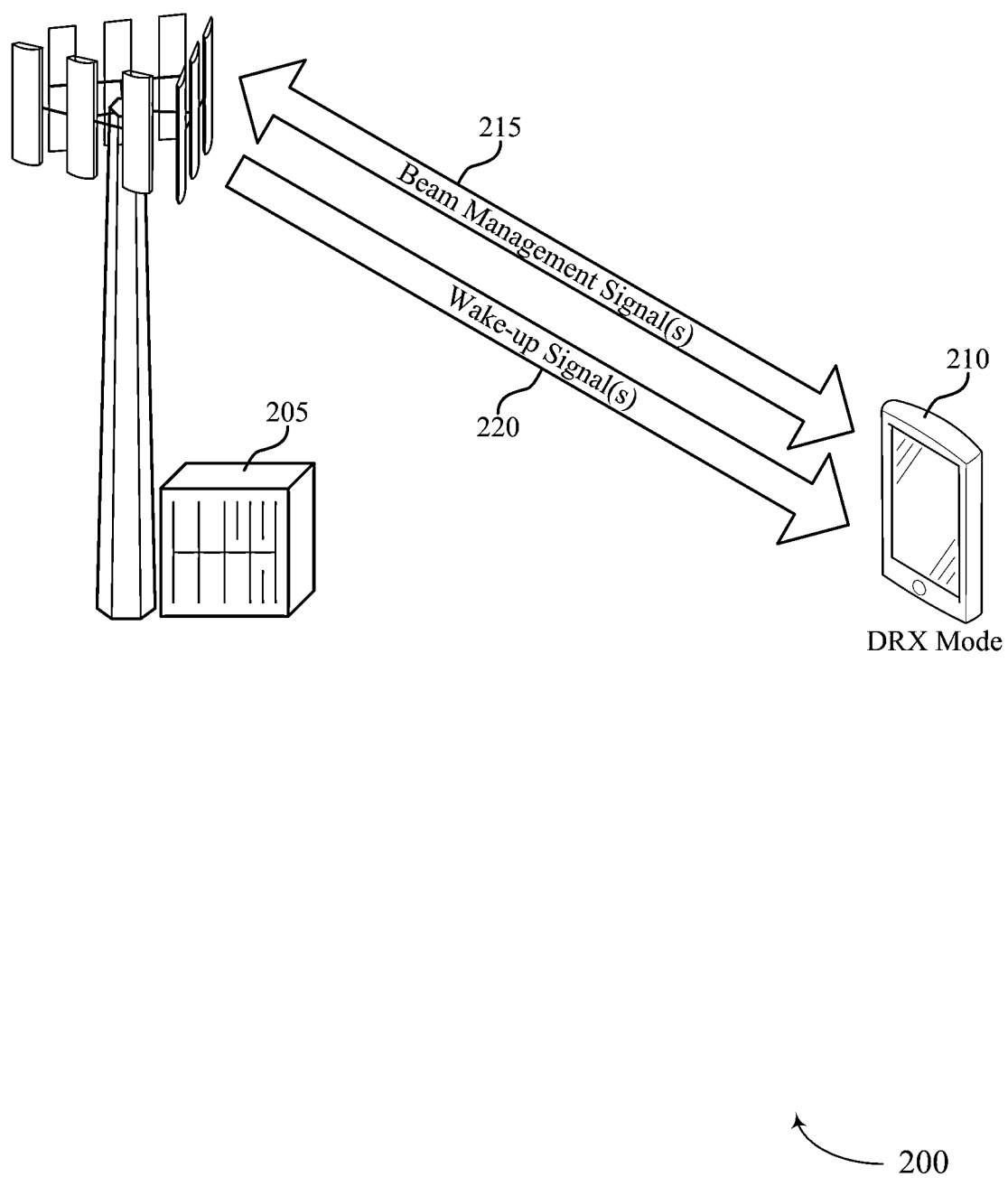
FIG. 2 illustrates an example of a wireless communications system that supports beam sweeping during an on-period of a DRX cycle in accordance with aspects of the present disclosure.

FIG. 2 illustrates an example of a wireless communications system 200 that supports techniques to order direction signals during discontinuous reception in accordance with aspects of the present disclosure. In some examples, the wireless communications system 200 may implement aspects of wireless communications system 100. The wireless communications system 200 may include one or more base stations 205 and one or more UEs 210. The base stations 205 may be examples of the base stations 105 described with reference to FIG. 1. The UEs 210 may be examples of the UEs 115 described with reference to FIG. 1.

In the wireless communications system 200, UEs 210 may be configured to enter a DRX mode to conserve power. Many UEs 210 may be battery-powered devices that may want to conserve power when not being used actively. Once way to conserve power is to enter a DRX mode. In some cases, the UE 210 may enter a connected mode discontinuous reception (C-DRX). With a DRX mode, during an off-period, the UE 210 may not be allowed to transmit various signals. Such a condition may allow the UE 210 to conserve power by not having its transmit chains and/or receive chains active and it may allow the base station 205 to assign these resources to other UEs to increase the efficiency of resource utilization.

In some cases, the wireless communications system 200 may communicate with the UE 210 using one or more directional beams. To maintain a communication link established using directional beams, the base station 205 and/or the UE 210 may perform one or more beam management procedures. These beam management procedures may be performed periodically to maintain the communication link. Directional beams serve a more limited geographic area than wider beams or omni-directional beams. As such, as the UE 210 moves through the network, the communication links that use directional beams are more susceptible to failure or fading.

A beam management procedure may include the transmission of beam management signals 215 in both uplink and downlink. For example, the base station 205 may transmit a set of reference signals using a plurality of different beams (e.g., a plurality of different directions). Examples of the reference signals may include channel state information reference signals (CSI-RSs), demodulation reference signals (DMRSs), primary synchronization signals (PSSs), secondary synchronization signals (SSSs), or physical broadcast channel (PBCH) signals, or a combination thereof. The UE 210 may listen for these reference signals, may measure channel conditions for these reference signals, and my select one or more beams (e.g., beams with the best channel conditions) to use for future communications. The UE 210 may report the channel condition information or the selected beams to the base station 205. Similar procedures may be performed for uplink communications as part of a beam management procedure. Using this information, the base station 205 may adjust the beam(s) used for the communication link with the UE 210. In such a manner, the base station 205 and the UE 210 may use beam management procedures to maintain a communication link, even when UEs 210 are moving through a coverage area.

When a UE 210 operates in a DRX mode, the beam management procedures used to maintain the communication link may consume more power than the UE 210 desires. Because directional beams are sensitive to movement by the UE 210, beam management procedures may be performed more frequently than other link management procedures in more omni-directional networks.

Further, the base station 205 may configure wake-up signals 220 to be communicated using certain directional beams. Even in a DRX mode, the base station 205 and the UE 210 may maintain active beams to ensure that wake-up signals 220 are detectable by the UE 210. A wake-up signal 220 may be transmitted to a UE 210 operating in a DRX mode during an on-period of the DRX mode. The wake-up signal 220 may indicate to the UE 210 that the base station 205 has information waiting to be transmitted to the UE 210. Upon receiving the wake-up signal 220, the UE 210 may enter an active mode and activate its transmit/receive chains to receive the information from the base station 205.

Techniques are described herein for periodically transmitting a first set of signals (e.g., reference signals) during an on-period of the DRX cycle rather than during the off-period of the DRX cycle. In such situations, the UE 210 may not monitor certain channels during the off-period, thereby conserving power.

Figure 3:
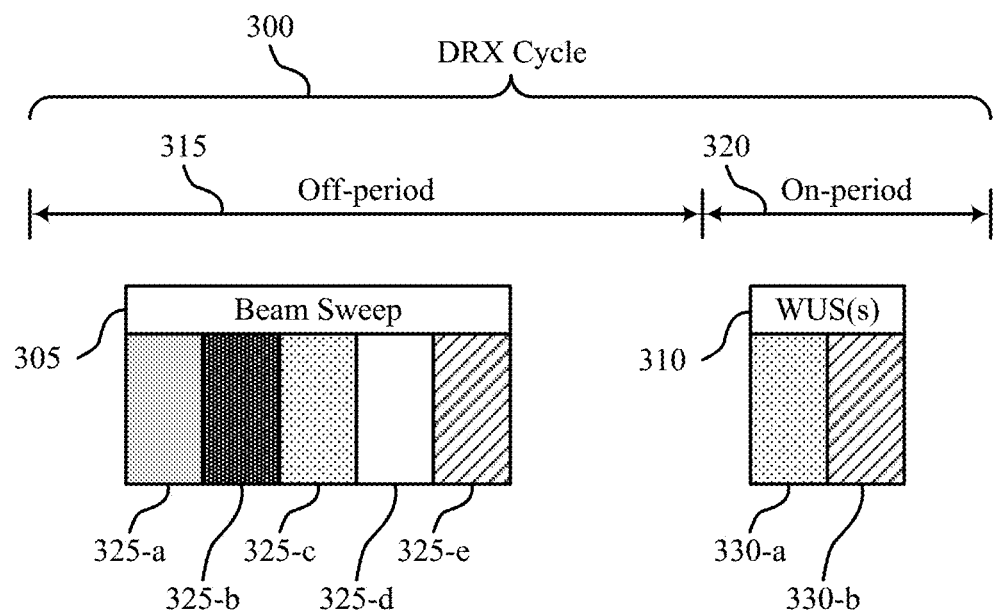
FIG. 3 illustrates an example of a DRX cycle that supports beam sweeping during an on-period of a DRX cycle in accordance with aspects of the present disclosure.

FIG. 3 illustrates an example of a DRX cycle 300 that supports techniques to order direction signals during discontinuous reception in accordance various aspects of the present disclosure. In some examples, the DRX cycle 300 may implement aspects of the wireless communications systems 100 or 200.

The DRX cycle 300 illustrates how a beam sweep 305 of reference signals (e.g., beam management procedure) and wake-up signals 310 may be communicated during a DRX cycle 300. The DRX cycle 300 may include an off-period 315 and an on-period 320. The DRX cycle 300 may represent one off-period 315 and one on-period 320. During the on-period 320, a UE 210 may monitor a physical downlink control channel (PDCCH) (e.g., for a wake-up signal 310). During the off-period 315, the UE 210 may enter a sleep state and not monitor certain channels. During the off-period 315, the UE 210 may conserve energy by deactivating certain components used for reception and/or transmission.

In some cases, to maintain a communication link that uses directional beams, the base station 205 and the UE 210 may perform a beam management procedure during the off-period 315 of the DRX cycle 300. At least a portion of the beam management procedure may include the base station 205 transmitting reference signals 325 in a beam sweep 305. The reference signals 325 may be transmitted using a plurality of different beams or in a plurality of different directions. For example, a first reference signal 325-*a* may be transmitted in a first direction, a second reference signal 325-*b* may be transmitted in a second direction, a third reference signal 325-*c* may be transmitted in a third direction, a fourth reference signal 325-*d* may be transmitted in a fourth direction, a fifth reference signal 325-*e* may be transmitted in a fifth direction, etc.

The UE 210 may provide feedback information to the base station 205 indicating one or more of the beams associated with the reference signals 325 that may be used for wake-up-signals. For example, the UE 210 may indicate that the beam associated with the reference signal 325-*c* may be used for a wake-up signal 330-*a* and a beam associated with the reference signal 325-*e* may be used for a wake-up signal 330-*b*. Additional details about some of these operations are described with reference to FIG. 4.

To reduce the amount of power consumed by the UE 210 operating in the DRX mode while performing a beam management procedure, the base station 205 may periodically perform the beam sweep 305 during the on-period 320 rather than during the off-period 315. During such situations, the UE 210 may refrain from monitoring certain channels during the off-period 315 of that DRX cycle 300.

Figure 4:
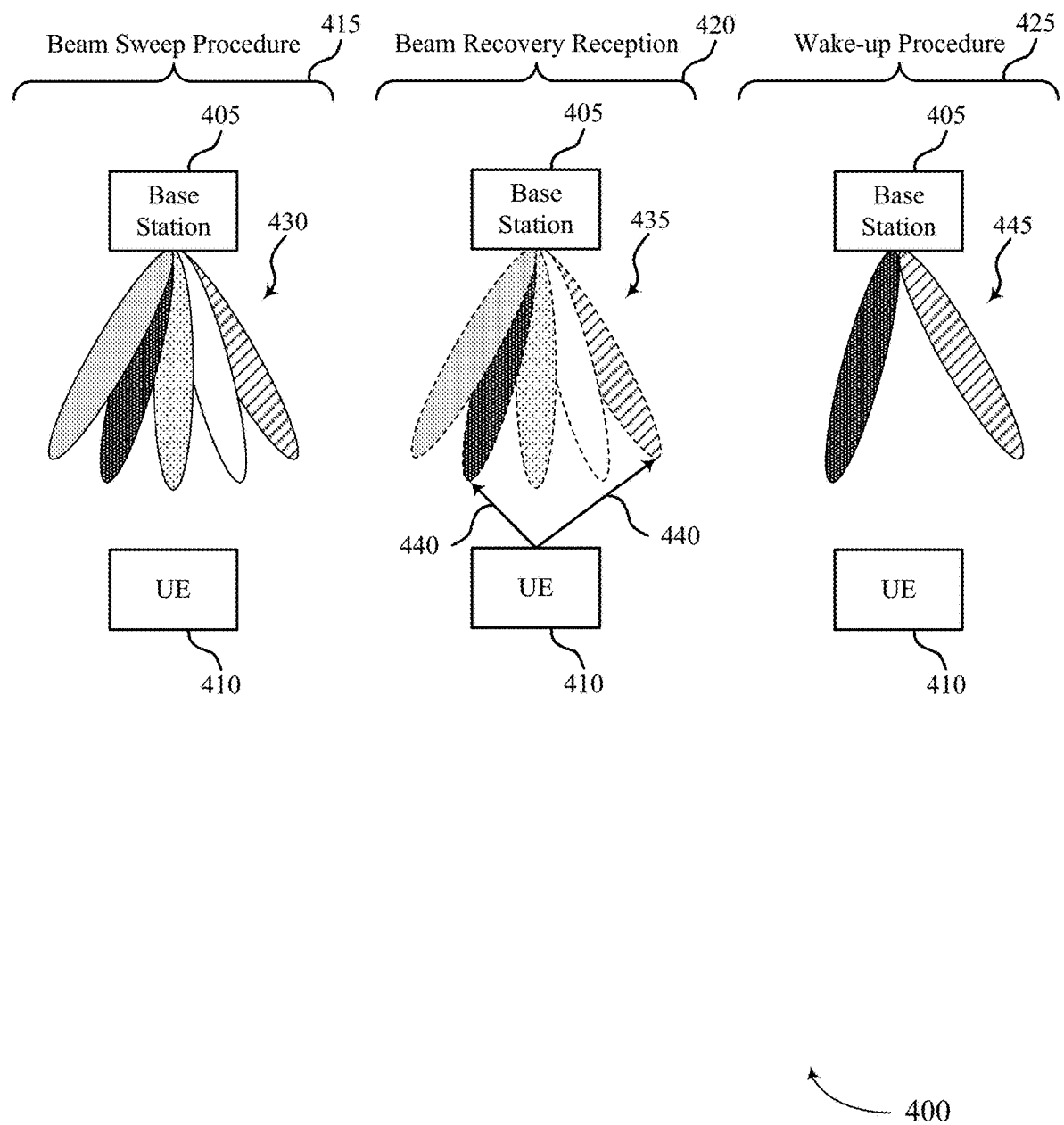
FIG. 4 illustrates examples of DRX procedures that support beam sweeping during an on-period of a DRX cycle in accordance with aspects of the present disclosure.

FIG. 4 illustrates examples of DRX procedures 400 that support techniques to order direction signals during discontinuous reception in accordance with aspects of the present disclosure. In some examples, the DRX procedures 400 may implement aspects of the wireless communications systems 100 or 200. The DRX procedures 400 include operations performed by and communications exchanged between base stations 405 and UEs 410. The base stations 405 may be examples of the base stations 105 and 205 described with reference to FIGS. 1-3. The UEs may be examples of the UEs 115 and 210 described with reference to FIGS. 1-3.

The DRX procedures 400 may include a beam sweep procedure 415, a beam recovery reception procedure 420, and a wake-up procedure 425. In some cases, the beam sweep procedure 415 and the beam recovery reception procedure 420 may be at least a portion of a beam management procedure.

During a beam sweep procedure 415, the base station 405 may transmit reference signals using a plurality of beams 430. For example, a reference signal may be transmitted using each beam. Each beam of the plurality of beams 430 may represent a unique beam configuration used during the beam sweep procedure 415. In some cases, each beam may be pointed in a different direction. The beam sweep procedure 415 may be performed during an off-period of the DRX cycle. Examples of reference signals may include CSI-RSs, DMRSs, PSSs, SSSs, or combinations thereof.

The UE 410 may listen for reference signals that use beams already designated for use by the base station 405 and the UE 410. For example, if the communication link between the base station 405 and the UE 410 uses the third beam of the plurality of beams 430. The UE 410 may measure a signal quality of that beam. If the preconfigured beam satisfies a signal quality threshold, the UE 410 may cease listening to other reference signals may go back to sleep. In such situations, the UE 410 may not transmit any feedback information to the base station 405. The base station 405 may interpret the silence from the UE 410 as stating that the communication link is fine as currently configured.

If the preconfigured beam fails to satisfy the signal quality threshold, the UE 410 may listen for the reference signals during the beam sweep procedure 415. The UE 410 may measure a signal quality of each of the reference signals received from the base station 405. Examples of the signal qualities that may be measured by the UE 410 may include received signal received power (RSRP), received signal received quality (RSRQ), a signal-to-noise ratio (SNR), a signal-to-interference-plus-noise ratio (SNIR), or a combination thereof.

In some cases, the UE 410 may select one or more beams to be used for future communications (e.g., wake-up signals). In such cases, the UE 410 may select a beam or a beam index from the beams 430 to be used to communicate a wake-up signal. In some cases, the UE 410 may identify a first beam to communicate the wake-up signal during an on-period of the DRX cycle.

The UE 410 may transmit feedback information to the base station 405 about the signal conditions measured for the reference signals. In some cases, the feedback information may include RSRP, RSPQ, SNR, SNIR, or other measured quantities. In these cases, the base station 405 may select beams to use for wake-up signals. In some cases, the feedback information may include beam indexes of beams selected by the UE 410 to use for wake-up signals that satisfy respective thresholds. In some cases, the feedback information may indicate a primary beam preference and at least one or more secondary beam preferences. In such cases, the base station 405 may place the primary beam preference as the highest priority and the one or more secondary beam preferences as lower priorities.

In some cases, the UE 410 may use a beam recovery reception procedure 420 to report the feedback information. During a beam recovery reception procedure 420, the base station 405 may configure its receive chains with a plurality of reception configurations 435. The base station 405 may sweep through the reception configurations 435. In some cases, there is a one-to-one mapping between beams 430 used during the beam sweep procedure 415 and reception configurations 435 used during the beam recovery reception procedure 420.

The UE 410 may transmit one or more beam recovery signals 440 for each beam selected by the UE 410 for future communications (e.g., selected for use by wake-up signals). The UE 410 may transmit the beam recovery signals 440 to coincide with the reception configuration 435 that is associated with the selected beam. For example, the UE 410 may transmit a beam recovery signal 440 during a second reception configuration and a fifth reception configuration. This indicates that the UE 410 would prefer to communicate during using the second beam and fifth beam from the plurality of beams 430.

During the wake-up procedure 425, the base station 405 may transmit wake-up signals using the one or more selected beams 445. The wake-up procedure may be performed during an on-period of the DRX cycle of the UE 410. If the UE 410 determines that the base station 405 includes information waiting to be transmitted to the UE 410, the UE 410 may enter an active mode and receive the information from the base station 405.

In some cases, the beam sweep procedure 415 and the beam recovery reception procedure 420 may be performed during an off-period of a DRX cycle. In other cases, the base station 405 and/or the UE 410 may be configured to periodically perform the beam sweep procedure 415 and/or beam recovery reception procedure 420 during the on-period of the DRX cycle. In such situations, the UE 410 may be able to conserve some power by performing the beam management procedures during the on-period rather than during the off-period.

Figure 5:
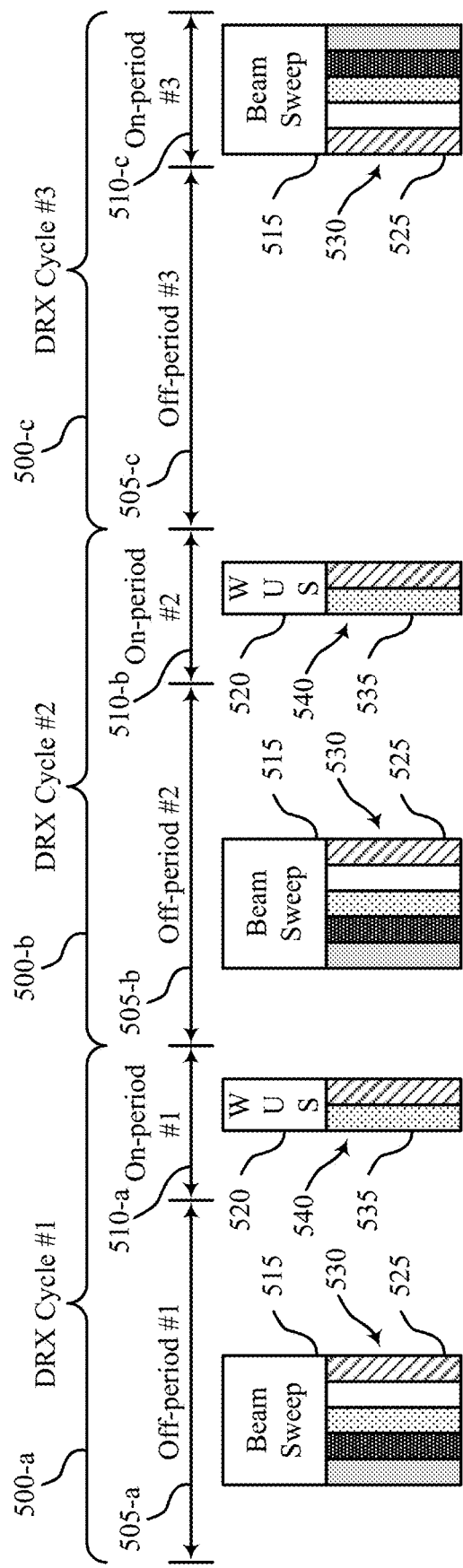
FIG. 5 illustrates examples of DRX cycles 300 that support beam sweeping during an on-period of a DRX cycle in accordance with aspects of the present disclosure.

FIG. 5 illustrates examples of DRX cycles 500 that support beam sweeping during an on-period of a DRX cycle in accordance with aspects of the present disclosure. In some examples, the DRX cycles 500 may implement aspects of wireless communications systems 100 and 200.

The DRX cycles 500 illustrate how beam management procedures and wake-up procedures may be performed across multiple DRX cycles. To maintain directional communication links while a UE operates in a DRX mode, beam sweeps of signals (e.g., reference signals) may be performed during an off-period of a DRX cycle. For example, beam sweeps 515 may be performed during an off-period 505-a of a first DRX cycle 500-a and during an off-period 505-b of a second DRX cycle 500-b. Performing the beam sweeps during the off-period may consume power of the UE and thereby reduce a total power savings associated with the DRX mode. To conserve additional power while operating in a DRX mode, periodically the beam sweep of signals may be communicated during an on-period of the DRX cycle rather than the-off period. For example, beam sweeps 515 may be performed during an on-period 510-c of a third DRX cycle 500-c. In such examples, the base station may refrain from transmitting a beam sweep 515 during the off-period 505-c of the third DRX cycle 500-c.

Each DRX cycle 500 include an off-period 505 and an on-period 510. During an on-period 510, a UE may monitor PDCCH (e.g., for a wake-up signal 310). During an off-period 505, the UE may enter a sleep state and not monitor certain channels. During the off-period 505, the UE may conserve energy by deactivating certain components used for reception and/or transmission. Each DRX cycle 500 includes at least one off-period 505 and at least one on-period 510. In some cases, a DRX cycle 500 may be defined as one off-period 505 and one on-period 510.

During an on-period 510 of a DRX cycle 500, a UE may be configured to at least partially wake-up (e.g., activate some or all of its communication components) and listen for a wake-up signal 535. The wake-up signal 535 may indicate to the UE whether the base station includes buffered data waiting to be transmitted to the UE. Occasionally, the UE and the base station may perform beam management procedures to maintain the communication link while the UE is operating in the DRX mode. When directional beams are used to establish a communication link, the UE and the base station may perform more beam management procedures than in other wireless communications systems. The UE may consume power when it performs these beam management procedures.

As part of some beam management procedures, the base station may perform a beam sweep 515 during an off-period 505 of a DRX cycle 500. The beam sweep 515 may include transmitting a set of signals 525 using a set of beams 530. In FIG. 5, each signal is represented by a box and each beam used to transmit that signal is represented by the shading of the box. In some cases, the signals 525 are reference signals. The UE may measure the reference signals and report to the base station which signals are suitable to be used for future communications.

During the on-period 510, the base station may perform a sweep 520 of wake-up signals 535 transmitted using a set of beams 540. In some cases, the set of beams 540 is a subset of the set of beams 530 used during the beam sweep 515. This may be because the base station may select which beams to use for wake-up signals 535 based on feedback from the UE after the beam sweep 515.

To conserve additional power while operating in the DRX mode, the wireless communication system that includes the base station and the UE may periodically cause the beam sweep of reference signals to occur during the on-period 510 of a DRX cycle 500, rather than the off-period of the DRX cycle 500. For example, during the third DRX cycle 500-c, the beam sweep 515 may be performed during the on-period 510-c rather than the off-period 505-c.

In some cases, the bases station and/or the UE may identify a periodicity for transmitting the reference signals 525 during the on-period 510 of the DRX cycle 500. For example, the base station may be configured to transmit the beam sweep 515 during an on-period 510 every one-in-N DRX cycles. In the illustrative example of FIG. 3, N is equal to three and the beam sweep 515 is transmitted during the on-period 510 every third DRX cycle.

Figure 6:
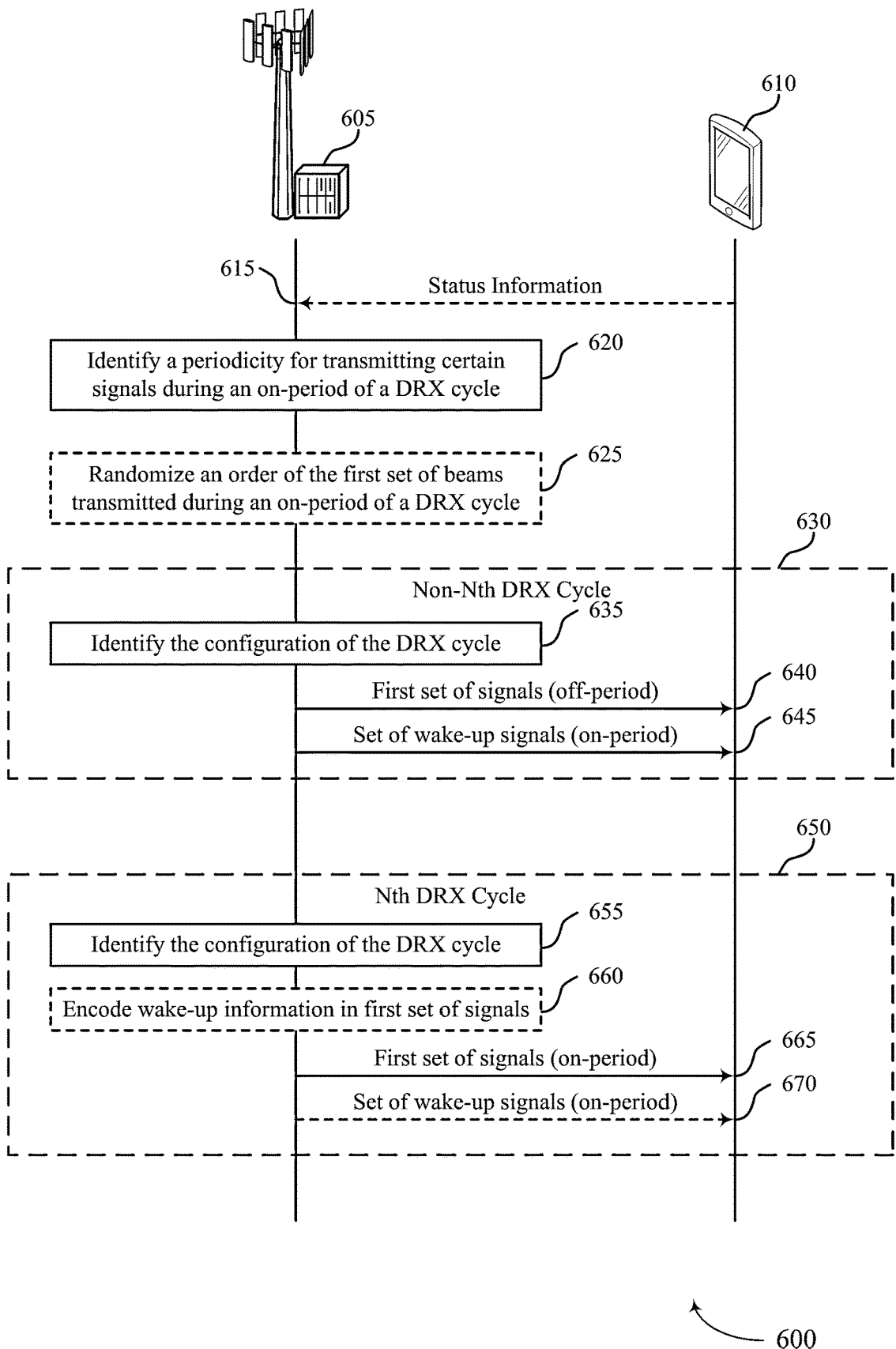
FIG. 6 illustrates an example of a process flow that supports beam sweeping during an on-period of a DRX cycle in accordance with aspects of the present disclosure.

FIG. 6 illustrates an example of a process flow 600 that supports beam sweeping during an on-period of a DRX cycle in accordance with aspects of the present disclosure. In some examples, the process flow 600 may implement aspects of wireless communications systems 100 and 200. The process flow 600 may include functions performed and communications exchanged between a base station 605 and a UE 610. The base station 605 may be an example of the base stations 105, 205, and 405 described with reference to FIGS. 1-5. The UE 610 may be an example of the UEs 115, 210, and 410 described with reference to FIGS. 1-5.

The process flow 600 may illustrate techniques for periodically transmitting reference signals during an on-period 510 of a DRX cycle 500 rather than during an off-period 505 of the DRX cycle 500. Such techniques may enable a UE operating in a DRX mode to conserve additional power during the DRX cycle.

The UE 610 may optionally transmit status information 615 to the base station 605. The status information 615 may indicate whether the UE 610 is operating in a DRX mode, a C-DRX mode, entering a DRX mode or C-DRX mode, leaving a DRX mode or a C-DRX mode, battery status information about the UE, or other information about the UE, or a combination thereof.

The base station 620 may determine a periodicity for transmitting certain signals during on-period 510 of a DRX cycle 500. For example, the base station 620 may determine a periodicity for transmitting a first set of signals (e.g., reference signals) during an on-period 510. The periodicity may indicate that the first set of signals may be transmitted during the on-period 510 every one-in-N DRX cycles 500, where N is an indicator of the periodicity. In some cases, the base station 605 may determine a periodicity for transmitting wake-up signals during the on-period 510 of a DRX cycle 500. In some cases, the UE 610 may identify the periodicity for transmitting the signals based on data or based on signaling from the base station 605. In some cases, the base station 605 may transmit a message to the UE 610 indicating the periodicity and the UE 610 may determine the periodicity based on receiving that message. In some cases, the first set of signals may be transmitted once in every N DRX on-periods and the second set of signals may be transmitted during the remaining non-N on-periods. For example, if N=3, the first set of signals may be transmitted during one DRX on-period in every three DRX on-periods while the second set of signals may be transmitted during the other two DRX on-periods of the three DRX on-periods during the periodicity. In some cases, the first set of signals may be transmitted once in every M DRX off-periods. The value of M and value of N may be different in some cases. The value of M may be equal to one in some cases.

At block 625, the base station 605 may optionally randomize an order of the first set of beams used to transmit the first set of signals (e.g., reference signals) during an on-period 510 or an off-period 505 of a DRX cycle 500. In some situations, reference signals may interfere with other signals or with other references when the network includes many nodes. To reduce interference between reference signals across one or more cells (e.g., interference from neighboring cells), the order of beams used to transmit the reference signals may be randomized to reduce the likelihood that two beams are transmitting the same signal at the same time. In some cases, the randomization of the first set of beams may be based on a cell identifier, a UE identifier, a UE group identifier, or a combination thereof. In some cases, the base station 605 may use a cell specific randomization seed to randomize the beams. In some cases, the beams are gNB beams.

At block 630, functions and communications associated with non-Nth DRX cycles are described. A non-Nth DRX cycle may refer to DRX cycles where the first set of signals are not transmitted during the on-period 510. Example of non-Nth DRX cycles may include the first DRX cycle 500-*a* and the second DRX cycle 500-*b* illustrated in FIG. 5.

At block 635, the base station 605 may identify the configuration of the DRX cycle. This may include comparing an index of the DRX cycle to a periodicity or periodicity parameter. In some cases, the base station 605 may apply a mod operator to the index of the DRX cycle to determine whether the first set of signals should be transmitted during the on-period 510.

Upon determining the configuration of the DRX cycle, the base station 605 may transmit a first set of signals 640 during an off-period 505 of the DRX cycle 500 (e.g., the first DRX cycle 500-*a* and the second DRX cycle 500-*b*). The first set of signals 640 may be examples of reference signals. For instance, the first set of signals 640 may be include CSI-RSs, PSSs, SSSs, DMRSs of PBCHs, or tracking reference signals, or a combination thereof. In some cases, the first set of signals 640 may include a PDCCH with one or more CRC bits scrambled using a radio network temporary identifier (RNTI) associated with the UE.

The base station 605 may transmit the second set of signals 645 during an on-period 510 of the DRX cycle 500 based on determining the configuration of the DRX cycle e.g., the first DRX cycle 500-*a* and the second DRX cycle 500-*b*). The second set of signals 645 may be examples of wake-up signals. The number of wake-up signals transmitted during the on-period may be different than the number of signals transmitted during the off-period.

At block 650, functions and communications associated with Nth DRX cycles are described. A Nth DRX cycle may refer to DRX cycles where the first set of signals are transmitted during the on-period 510. Example of a Nth DRX cycle may include the third DRX cycle 500-*c* illustrated in FIG. 5.

At block 655, the base station 605 may identify the configuration of the DRX cycle. This may include comparing an index of the DRX cycle to a periodicity or periodicity parameter. In some cases, the base station 605 may apply a mod operator to the index of the DRX cycle to determine whether the first set of signals should be transmitted during the on-period 510.

Upon determining the configuration of the DRX cycle, the base station 605 may transmit a first set of signals 665 during an on-period 510 of the DRX cycle 500 (e.g., the third DRX cycle 500-*c*). The first set of signals 665 may be examples of reference signals. For instance, the first set of signals 665 may be include CSI-RSs, PSSs, SSSs, DMRSs of PBCHs, or tracking reference signals, or a combination thereof. In some cases, the first set of signals 665 may include a PDCCH with one or more CRC bits scrambled using a RNTI associated with the UE. In some cases, the base station 605 may refrain from transmitting the first set of signals 665 during the off-period 505 during the DRX cycle 500 because the first set of signals 665 are being transmitted during the on-period 510 instead. During the off-period 505 associated with this on-period 510, the UE 610 may refrain from monitoring for the first set of signals 665.

When the first set of signals 665 are transmitted during the on-period 510, the base station 605 may determine what is to be done about transmitting the second set of signals 670 (e.g., the wake-up signals) during the on-period 510. In some cases, the base station 605 may refrain from transmitting the second set of signals 670 and instead may wait for an on-period 510 that does not include a transmission of the first set of signals 665 (e.g., the reference signals).

In some cases, at block 660, the base station 605 may optionally encode wake-up information in the first set of signals 665. In such cases, the first set of signals 665 may function both as reference signals and as wake-up signals. In some instances, every signal of the first set of signals is encoded with at least some wake-up information. In other instances, however, a subset of signals of the first set of signals 665 are encoded with wake-up information.

In some cases, the base station 605 may transmit the second set of signals 670 during the on-period 510 as well as transmitting the first set of signals 665. In such cases, both sets of signals are transmitted during the same on-period 510.

In some cases, the base station 605 may determine a location within the on-period for transmitting the first set of signals 665. The base station 605 may determine the location to distribute a "load" of training among UEs sharing the DRX cycle. In some cases, multiple UEs may at least partially share an on-period of a DRX cycle. The location of the transmission of the first set of signals 665 may be positioned to increase a number of UEs that may receive the first set of signals and thereby reduce the number of times the first set of signals may need to be transmitted.

In some cases, the base station 605 may refrain from transmitting the first set of signals in an off-period 505 of a DRX cycle 500 that is adjacent to a DRX cycle 500 where the first set of signals is transmitted during the on-period 510. For example, if the first set of signals are to be transmitted during the on-period 510-*c* of the third DRX cycle 500-*c,* the base station 605 may also refrain from transmitting the first set of signals during the off-period 505-*b* of the second DRX cycle or during the off-period 505 of a fourth DRX cycle. Such procedures may be configured to allow the UE 610 to conserve additional power.

In some cases, the beginning (sometimes referred to as the "head") of the on-period 510 may be used for fine beam training to pinpoint a desired beam quickly. In some cases, the ending (sometimes referred to as the "tail") of the on-period 510 may be used for course beam training to account for beam variation over the off-period 505. The first set of signals may be configured for fine beam training or course beam training. In such cases, the first set of signals may be transmitted twice during the same on-period 510. Similar operations for fine beam training and coarse beam training may be performed during an off-period 505 as well.

The UE 610 may transmit feedback information to the base station 605 in response to receiving the first set of signals. For example, the UE 610 may measure the signal quality of each signal of the first set of signals. The UE 610 may select new beams to be used for the communication using methods and procedures as discussed with reference to FIG. 4. Aspects of the process flow 600 may be combined with the DRX procedures 400 described with reference to FIG. 4.

Figure 7:
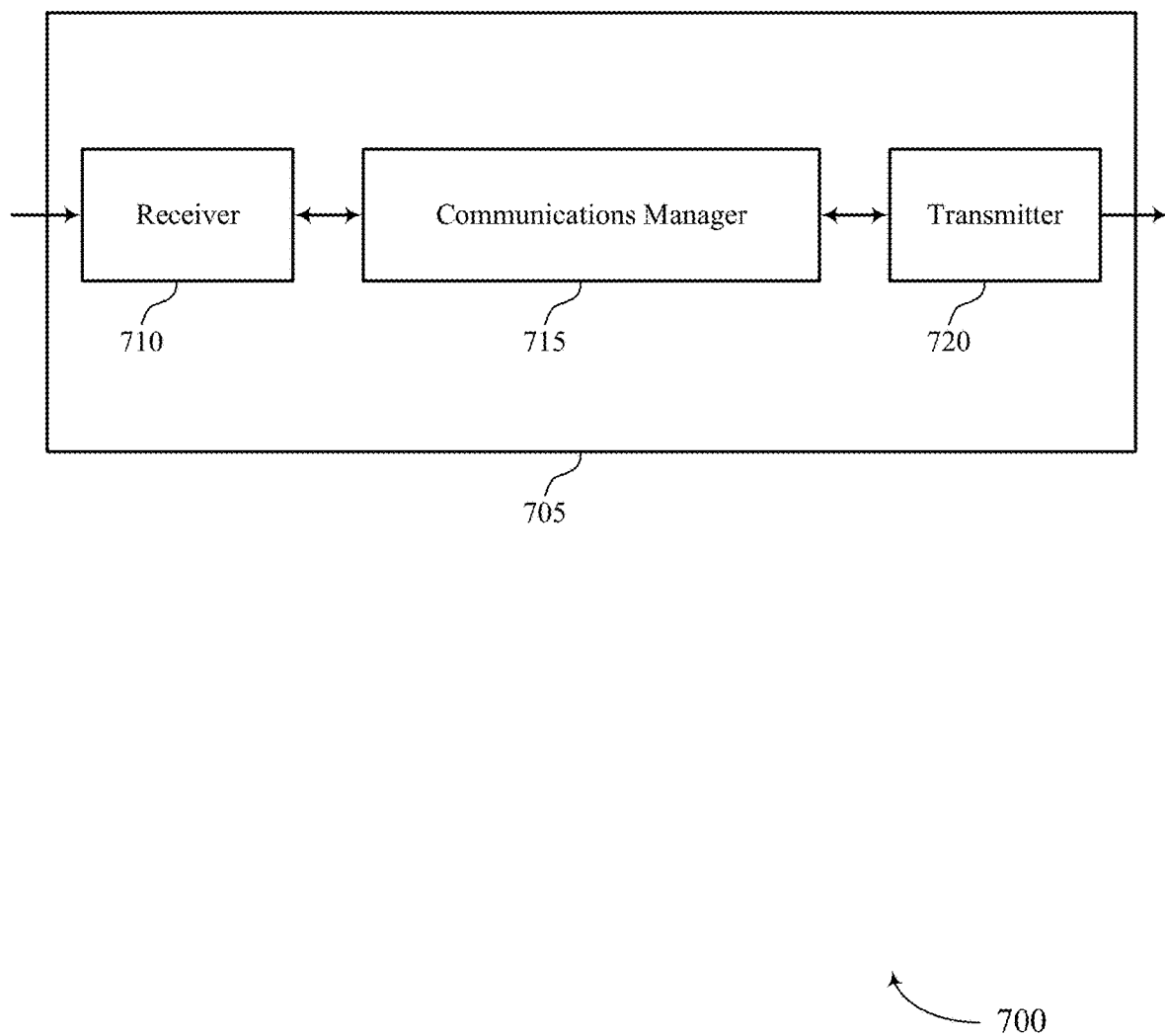
FIGS. 7 and 8 show block diagrams of devices that support beam sweeping during an on-period of a DRX cycle in accordance with aspects of the present disclosure.

FIG. 7 shows a block diagram 700 of a device 705 that supports beam sweeping during an on-period of a DRX cycle in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to beam sweeping during an on-period of a DRX cycle, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, by a UE operating in a DRX mode, a first set of signals using a first set of beams during an on-period of a first DRX cycle associated with the UE and receive, by the UE, a second set of wake-up signals using a second set of beams during an on-period of a second DRX cycle associated with the UE, the second DRX cycle being different from the first DRX cycle. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
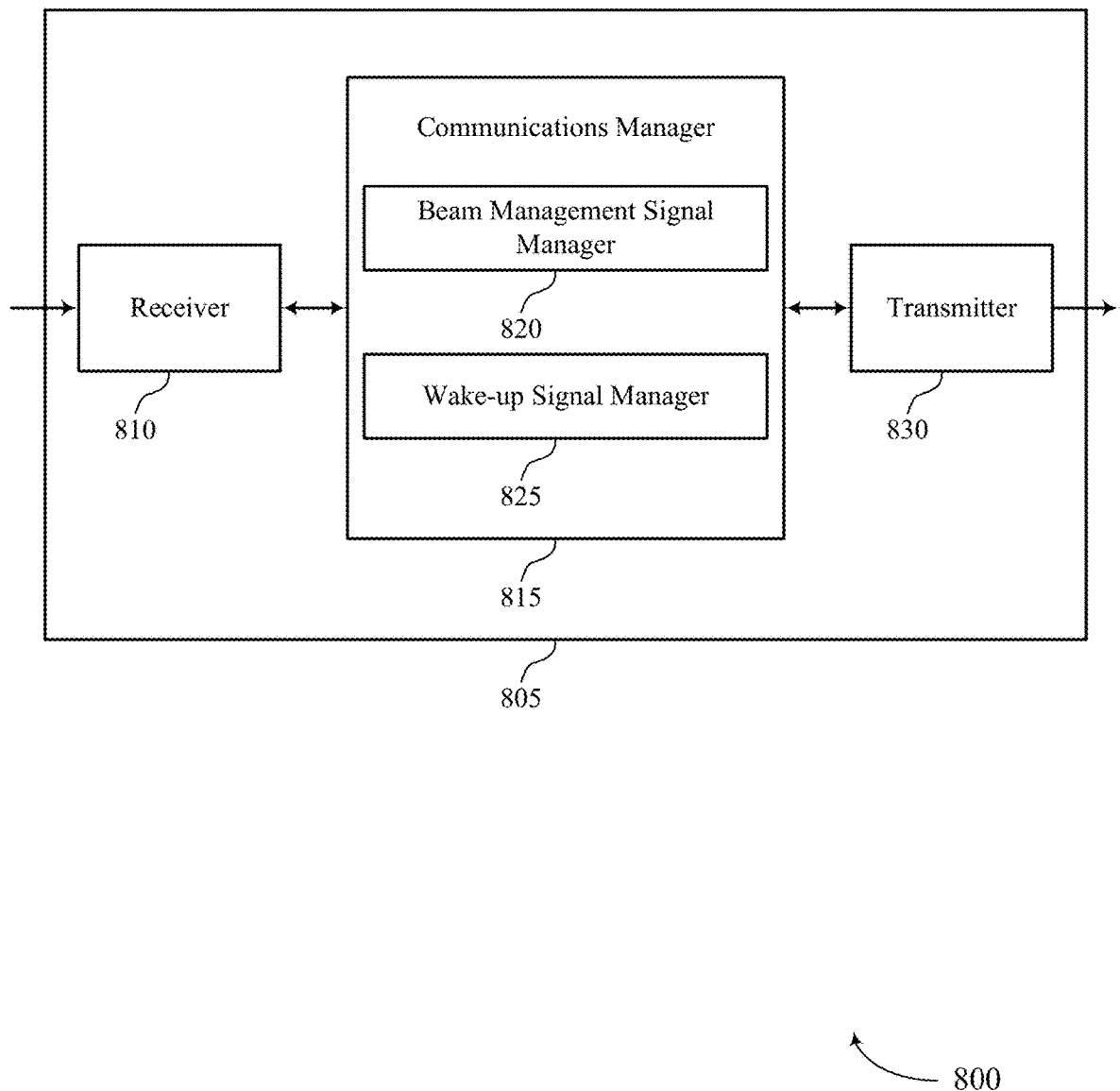

FIG. 8 shows a block diagram 800 of a device 805 that supports beam sweeping during an on-period of a DRX cycle in accordance with aspects of the present disclosure. The device 805 may be an example of aspects of a device 705 or a UE 115 as described herein. The device 805 may include a receiver 810, a communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to beam sweeping during an on-period of a DRX cycle, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a beam management signal manager 820 and a wake-up signal manager 825. The communications manager 815 may be an example of aspects of the communications manager 1010 described herein.

The beam management signal manager 820 may receive, by a UE operating in a DRX mode, a first set of signals using a first set of beams during an on-period of a first DRX cycle associated with the UE.

The wake-up signal manager 825 may receive, by the UE, a second set of wake-up signals using a second set of beams during an on-period of a second DRX cycle associated with the UE, the second DRX cycle being different from the first DRX cycle.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
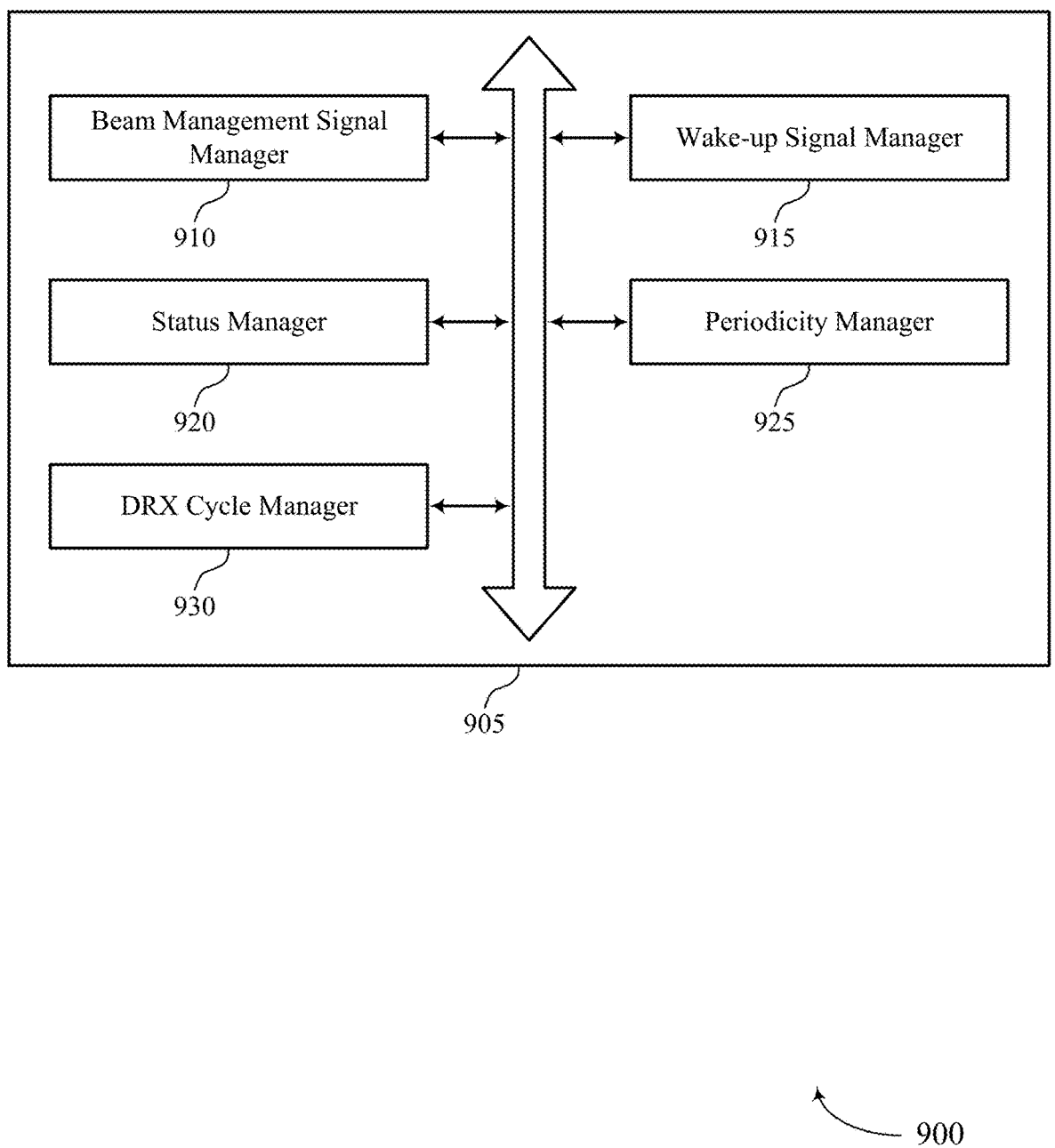
FIG. 9 shows a block diagram of a communications manager that supports beam sweeping during an on-period of a DRX cycle in accordance with aspects of the present disclosure.

FIG. 9 shows a block diagram 900 of a communications manager 905 that supports beam sweeping during an on-period of a DRX cycle in accordance with aspects of the present disclosure. The communications manager 905 may be an example of aspects of a communications manager 715, a communications manager 815, or a communications manager 1010 described herein. The communications manager 905 may include a beam management signal manager 910, a wake-up signal manager 915, a status manager 920, a periodicity manager 925, and a DRX cycle manager 930. Each of these modules may communicate, directly or indirectly, with one another (e.g., via one or more buses).

The beam management signal manager 910 may receive, by a UE operating in a DRX mode, a first set of signals using a first set of beams during an on-period of a first DRX cycle associated with the UE. In some cases, the first set of signals are received during an on-period of a DRX cycle once in every N DRX cycles. In some cases, the first set of signals includes a set of reference signals. In some cases, the first set of signals includes a PDCCH with one or more CRC bits scrambled using a RNTI associated with the UE. In some cases, the first set of signals includes CSI-RSs, PSSs, SSSs, DMRSs of PBCHs, or tracking reference signals, or a combination thereof.

The wake-up signal manager 915 may receive, by the UE, a second set of wake-up signals using a second set of beams during an on-period of a second DRX cycle associated with the UE, the second DRX cycle being different from the first DRX cycle. In some examples, the wake-up signal manager 915 may identify wake-up information encoded in at least one reference signal of the first set of signals transmitted during the on-period of the first DRX cycle. In some cases, the second set of beams is a subset of the first set of beams. In some cases, a number of beams in the first set of beams is different from a number of beams in the second set of beams.

The status manager 920 may transmit, by the UE, status information about the UE, where receiving the first set of signals is based on transmitting the status information. In some examples, the status manager 920 may transmit battery status information to a base station. In some cases, the UE is in a C-DRX mode.

The periodicity manager 925 may identify a periodicity of the first set of signals and the second set of wake-up signals based on transmitting the status information.

The DRX cycle manager 930 may receive the first set of signals during an off-period of the second DRX cycle based on receiving the second set of wake-up signals during the on-period of the second DRX cycle. In some examples, the DRX cycle manager 930 may receive the second set of wake-up signals during the on-period of the first DRX cycle based on receiving the first set of signals during the on-period of the first DRX cycle.

Figure 10:
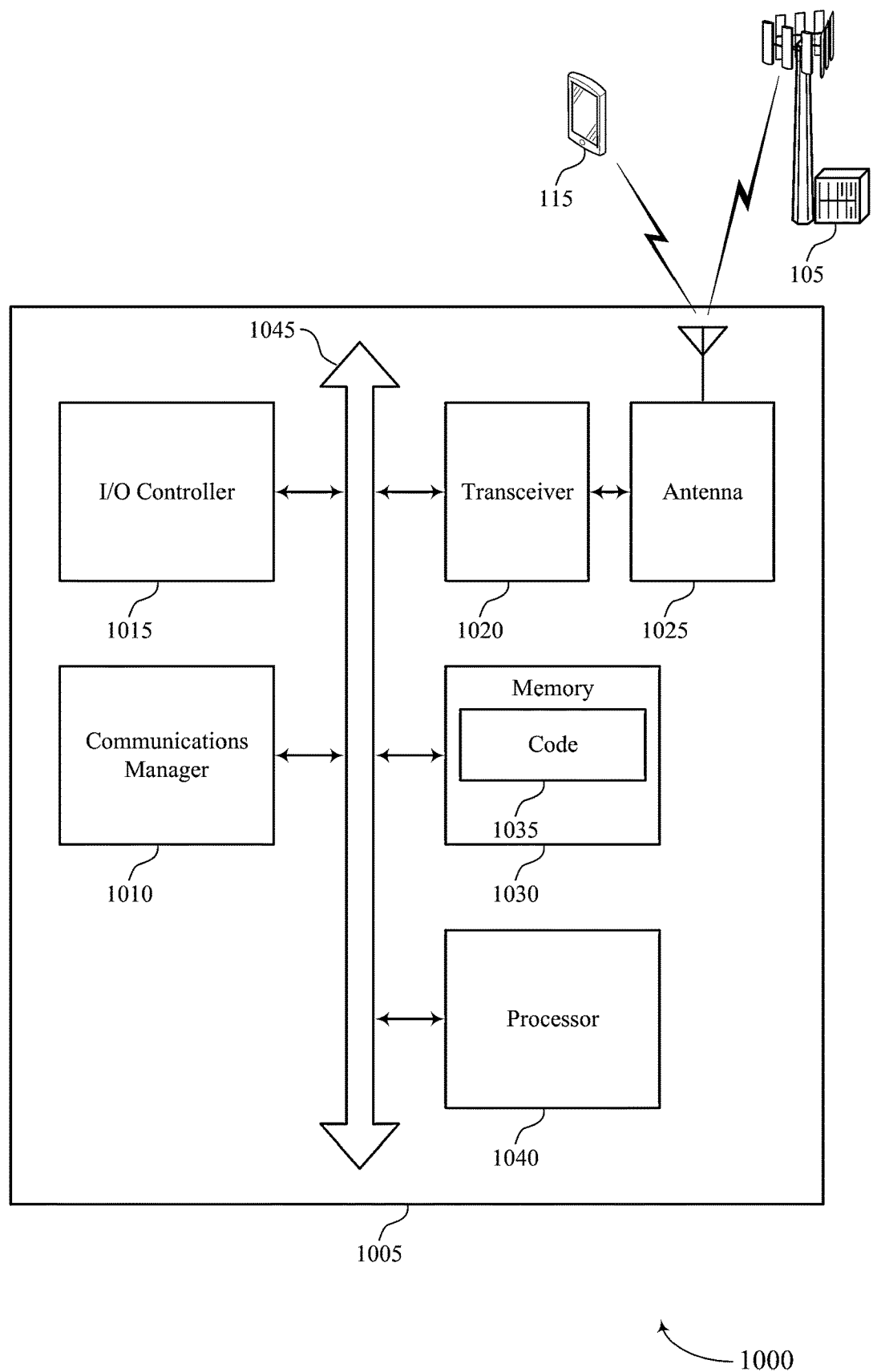
FIG. 10 shows a diagram of a system including a device that supports beam sweeping during an on-period of a DRX cycle in accordance with aspects of the present disclosure.

FIG. 10 shows a diagram of a system 1000 including a device 1005 that supports beam sweeping during an on-period of a DRX cycle in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, by a UE operating in a DRX mode, a first set of signals using a first set of beams during an on-period of a first DRX cycle associated with the UE and receive, by the UE, a second set of wake-up signals using a second set of beams during an on-period of a second DRX cycle associated with the UE, the second DRX cycle being different from the first DRX cycle.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam sweeping during an on-period of a DRX cycle).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
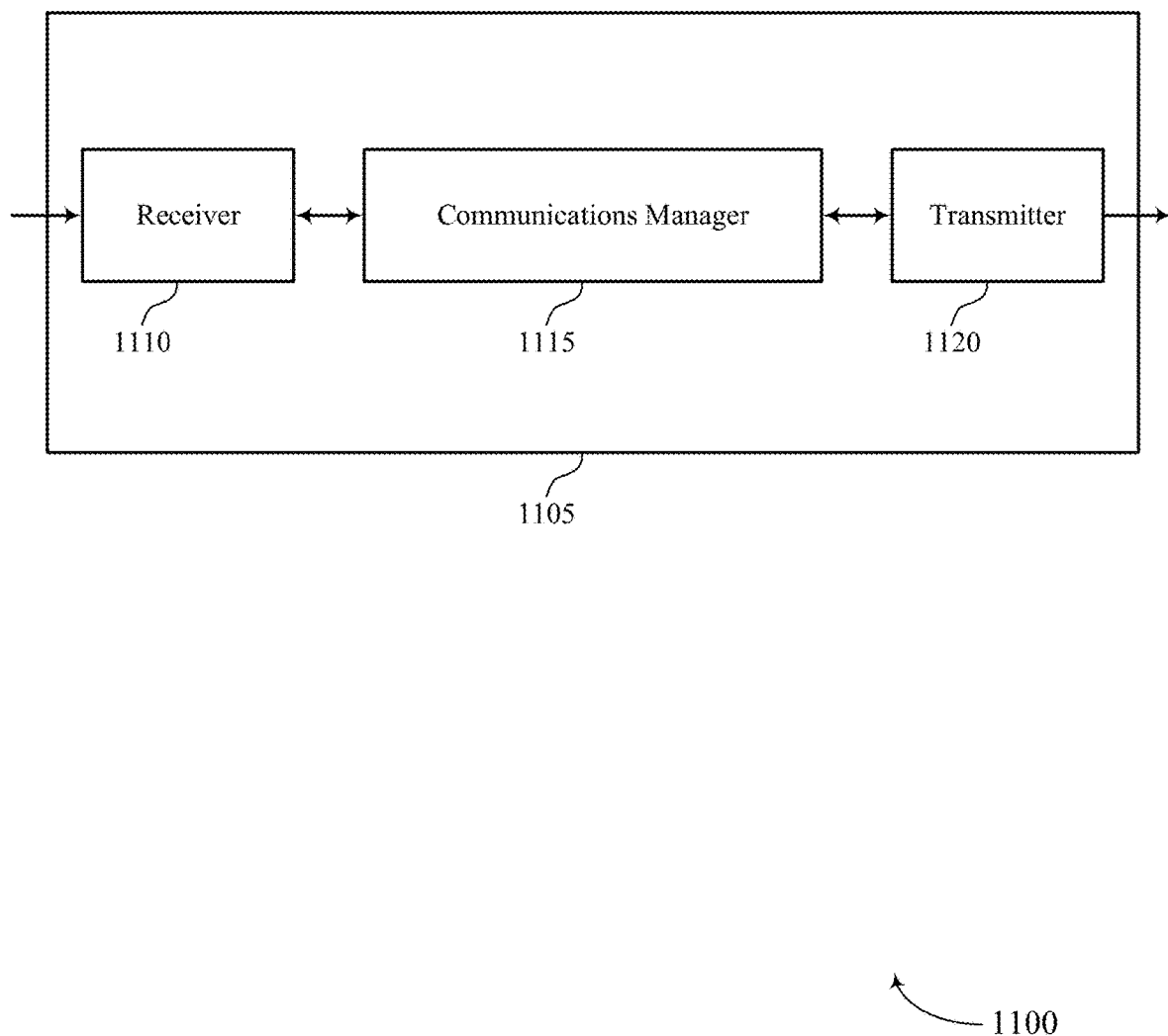
FIGS. 11 and 12 show block diagrams of devices that support beam sweeping during an on-period of a DRX cycle in accordance with aspects of the present disclosure.

FIG. 11 shows a block diagram 1100 of a device 1105 that supports beam sweeping during an on-period of a DRX cycle in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to beam sweeping during an on-period of a DRX cycle, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE operating in a DRX mode, a first set of signals using a first set of beams during an on-period of a first DRX cycle associated with the UE and transmit, to the UE, a second set of wake-up signals using a second set of beams during an on-period of a second DRX cycle associated with the UE, the second DRX cycle being different from the first DRX cycle. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
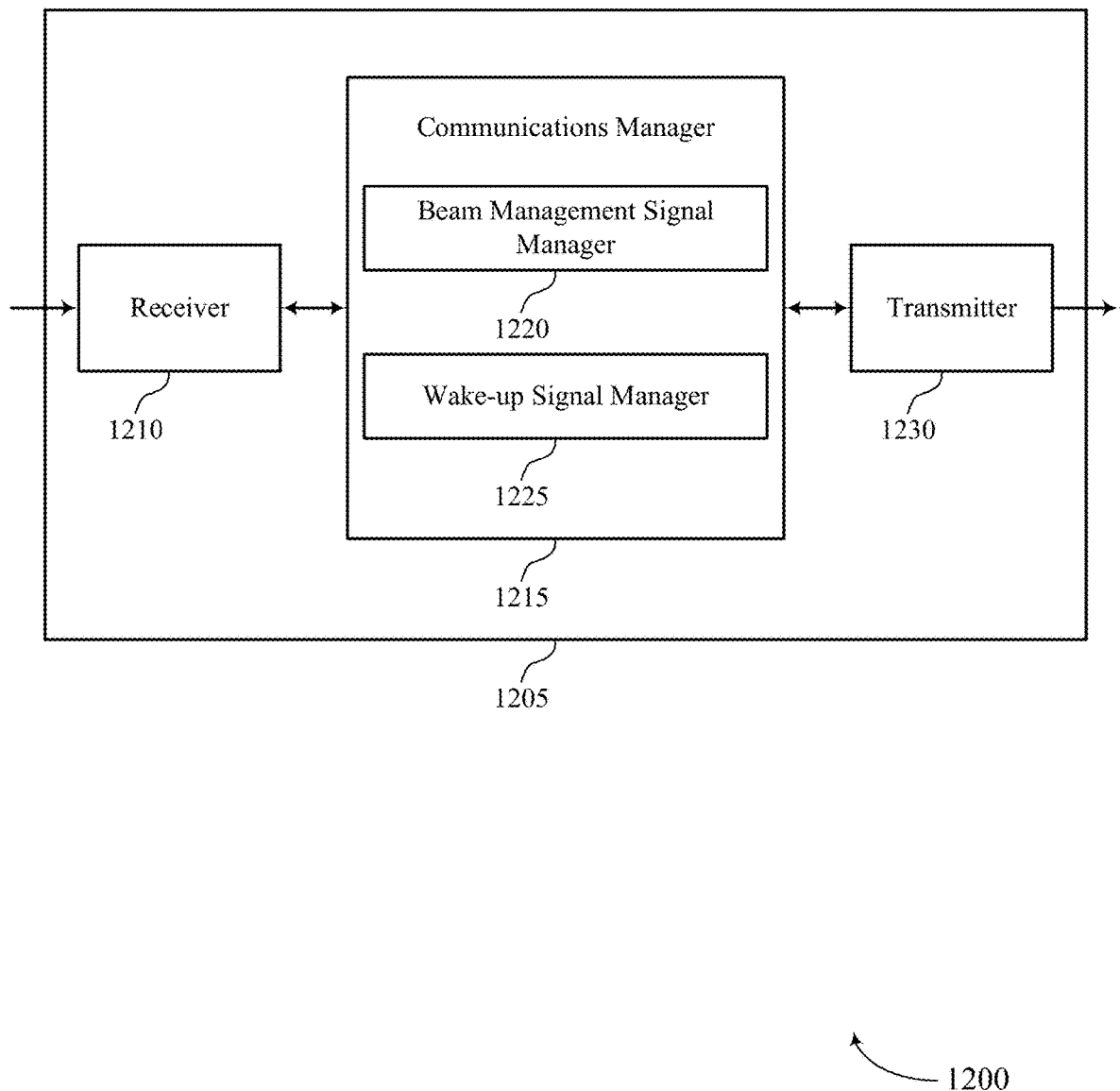

FIG. 12 shows a block diagram 1200 of a device 1205 that supports beam sweeping during an on-period of a DRX cycle in accordance with aspects of the present disclosure. The device 1205 may be an example of aspects of a device 1105 or a UE 115 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to beam sweeping during an on-period of a DRX cycle, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a beam management signal manager 1220 and a wake-up signal manager 1225. The communications manager 1215 may be an example of aspects of the communications manager 1410 described herein.

The beam management signal manager 1220 may transmit, to a UE operating in a DRX mode, a first set of signals using a first set of beams during an on-period of a first DRX cycle associated with the UE.

The wake-up signal manager 1225 may transmit, to the UE, a second set of wake-up signals using a second set of beams during an on-period of a second DRX cycle associated with the UE, the second DRX cycle being different from the first DRX cycle.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
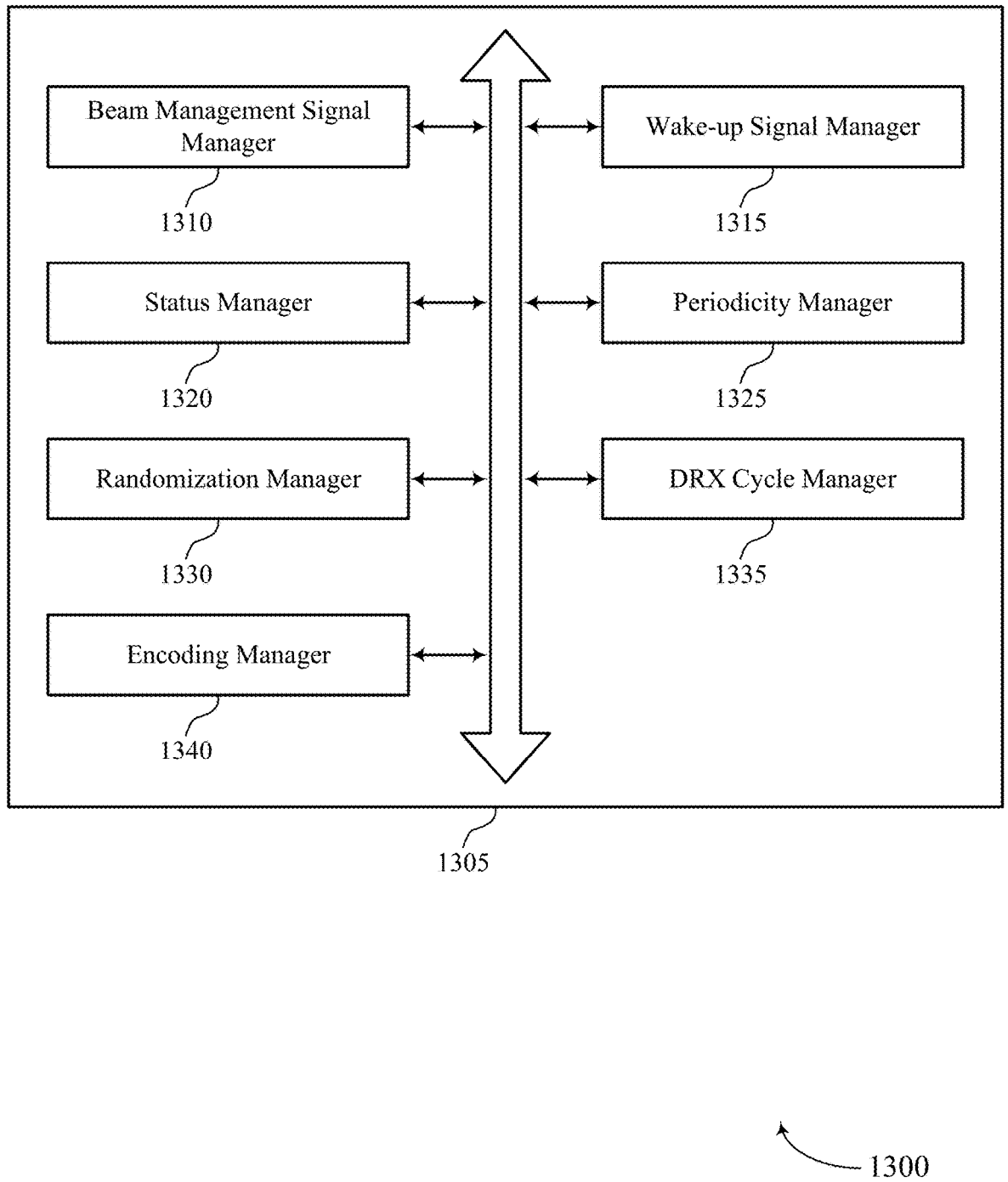
FIG. 13 shows a block diagram of a communications manager that supports beam sweeping during an on-period of a DRX cycle in accordance with aspects of the present disclosure.

FIG. 13 shows a block diagram 1300 of a communications manager 1305 that supports beam sweeping during an on-period of a DRX cycle in accordance with aspects of the present disclosure. The communications manager 1305 may be an example of aspects of a communications manager 1115, a communications manager 1215, or a communications manager 1410 described herein. The communications manager 1305 may include a beam management signal manager 1310, a wake-up signal manager 1315, a status manager 1320, a periodicity manager 1325, a randomization manager 1330, a DRX cycle manager 1335, and an encoding manager 1340. Each of these modules may communicate, directly or indirectly, with one another (e.g., via one or more buses).

The beam management signal manager 1310 may transmit, to a UE operating in a DRX mode, a first set of signals using a first set of beams during an on-period of a first DRX cycle associated with the UE. In some cases, the first set of signals are transmitted during an on-period of a DRX cycle once in every N DRX cycles. In some cases, a number of beams in the first set of beams is different from a number of beams in the second set of beams. In some cases, the first set of signals includes CSI-RSs, PSSs, SSSs, DMRSs of PBCHs, or tracking reference signals, or a combination thereof. In some cases, the first set of signals includes a set of reference signals. In some cases, the first set of signals includes a PDCCH with one or more CRC bits scrambled using a RNTI associated with the UE.

The wake-up signal manager 1315 may transmit, to the UE, a second set of wake-up signals using a second set of beams during an on-period of a second DRX cycle associated with the UE, the second DRX cycle being different from the first DRX cycle. In some examples, the wake-up signal manager 1315 may transmit the second set of wake-up signals during the on-period of the first DRX cycle based on transmitting the first set of signals during the on-period of the first DRX cycle. In some cases, the second set of beams is a subset of the first set of beams.

The status manager 1320 may receive, from the UE, status information about the UE, where transmitting the first set of signals is based on receiving the status information. In some examples, the status manager 1320 may receive battery status information from the UE. In some cases, the UE is in a C-DRX mode.

The periodicity manager 1325 may identify a periodicity of the first set of signals and the second set of wake-up signals based on receiving the status information. In some examples, the periodicity manager 1325 may identify the first DRX cycle as a DRX cycle where the first set of signals are transmitted during an on-period of the DRX cycle, where transmitting the first set of signals is based on identifying the first DRX cycle.

The randomization manager 1330 may randomize an order of the first set of beams transmitted during the on-period of the first DRX cycle across one or more cells, where transmitting the first set of signals is based on randomizing the order. In some examples, the randomization manager 1330 may randomization of the first set of beams is based on a cell identifier, a UE identifier, or a UE group identifier, or a combination thereof.

The DRX cycle manager 1335 may refrain from transmitting the first set of signals during an off-period of the first DRX cycle based on transmitting the first set of signals during the on-period of the first DRX cycle. In some examples, the DRX cycle manager 1335 may transmit the first set of signals during an off-period of the second DRX cycle based on transmitting the second set of wake-up signals during the on-period of the second DRX cycle. In some examples, the DRX cycle manager 1335 may refrain from transmitting the first set of signals during an off-period of a DRX cycle adjacent to the first DRX cycle.

The encoding manager 1340 may encode wake-up information into at least one reference signal of the first set of signals transmitted during the on-period of the first DRX cycle, where transmitting the first set of signals during the on-period of the first DRX cycle is based on encoding the wake-up information into the at least one reference signal.

Figure 14:
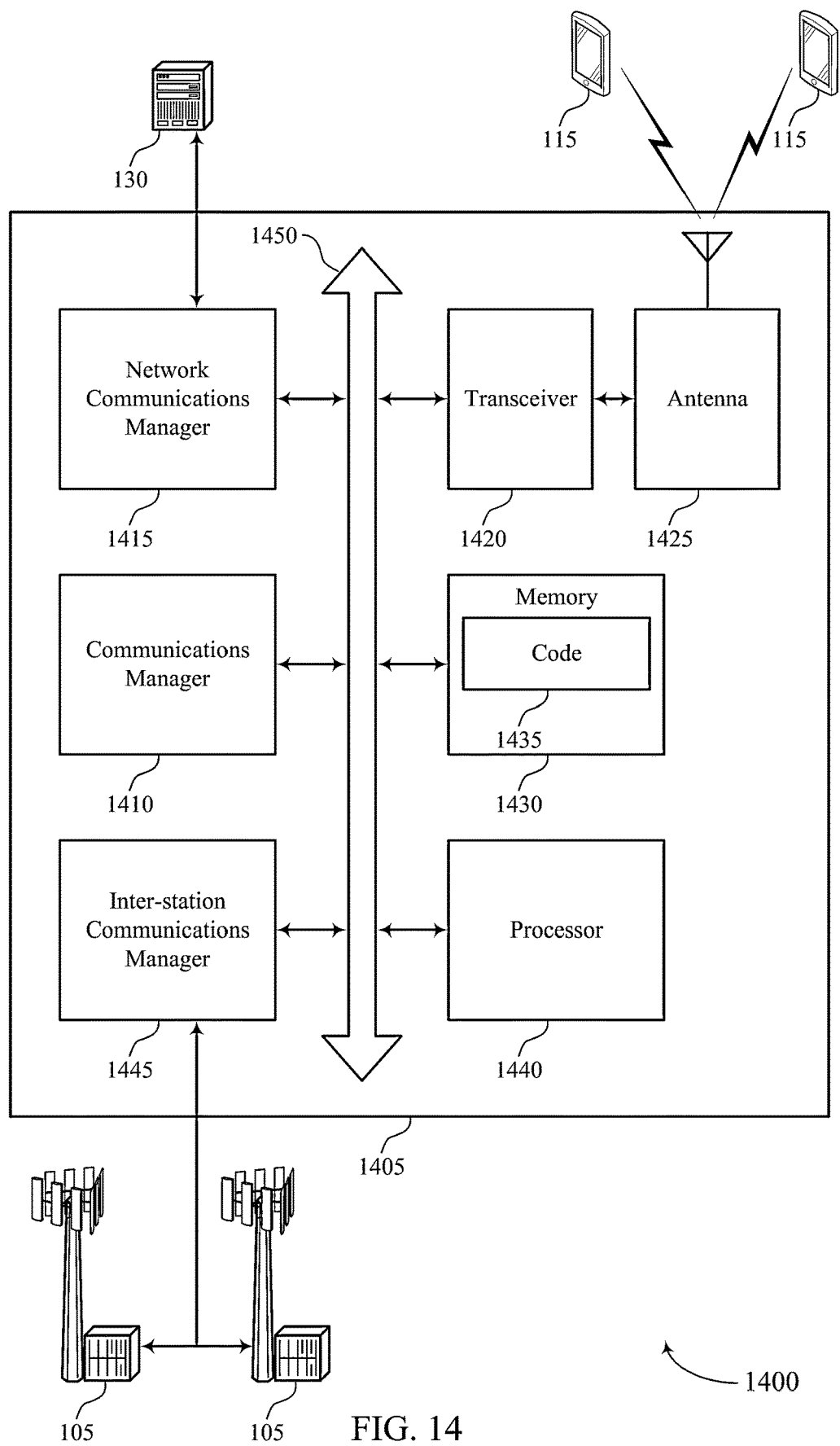
FIG. 14 shows a diagram of a system including a device that supports beam sweeping during an on-period of a DRX cycle in accordance with aspects of the present disclosure.

FIG. 14 shows a diagram of a system 1400 including a device 1405 that supports beam sweeping during an on-period of a DRX cycle in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE operating in a DRX mode, a first set of signals using a first set of beams during an on-period of a first DRX cycle associated with the UE and transmit, to the UE, a second set of wake-up signals using a second set of beams during an on-period of a second DRX cycle associated with the UE, the second DRX cycle being different from the first DRX cycle.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting beam sweeping during an on-period of a DRX cycle).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
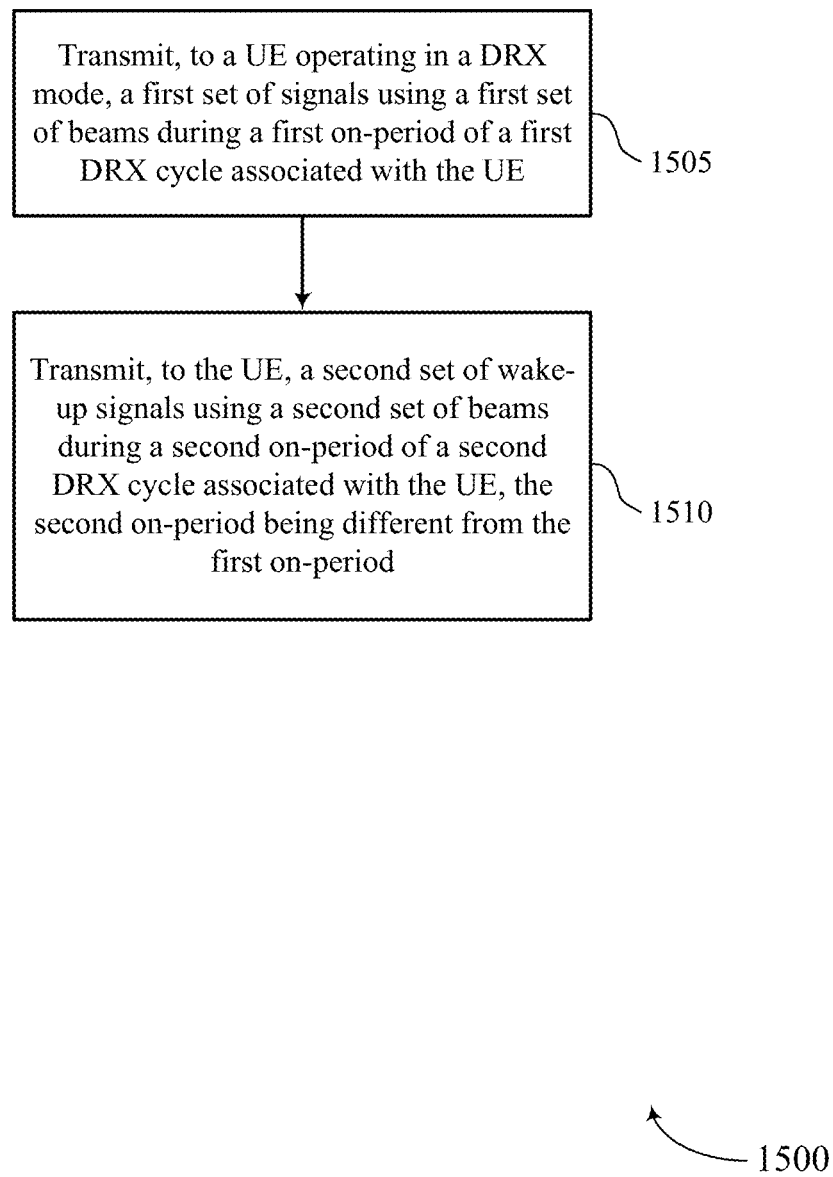
FIGS. 15 through 18 show flowcharts illustrating methods that support beam sweeping during an on-period of a DRX cycle in accordance with aspects of the present disclosure.

FIG. 15 shows a flowchart illustrating a method 1500 that supports beam sweeping during an on-period of a DRX cycle in accordance with aspects of the present disclosure. The operations of method 1500 may be implemented by a base station 105 or its components as described herein. For example, the operations of method 1500 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1505, the base station may transmit, to a UE operating in a DRX mode, a first set of signals using a first set of beams during a first on-period of a first DRX cycle associated with the UE. The operations of 1505 may be performed according to the methods described herein. In some examples, aspects of the operations of 1505 may be performed by a beam management signal manager as described with reference to FIGS. 11 through 14.

At 1510, the base station may transmit, to the UE, a second set of wake-up signals using a second set of beams during a second on-period of a second DRX cycle associated with the UE, the second on-period being different from the first on-period. The operations of 1510 may be performed according to the methods described herein. In some examples, aspects of the operations of 1510 may be performed by a wake-up signal manager as described with reference to FIGS. 11 through 14.

Figure 16:
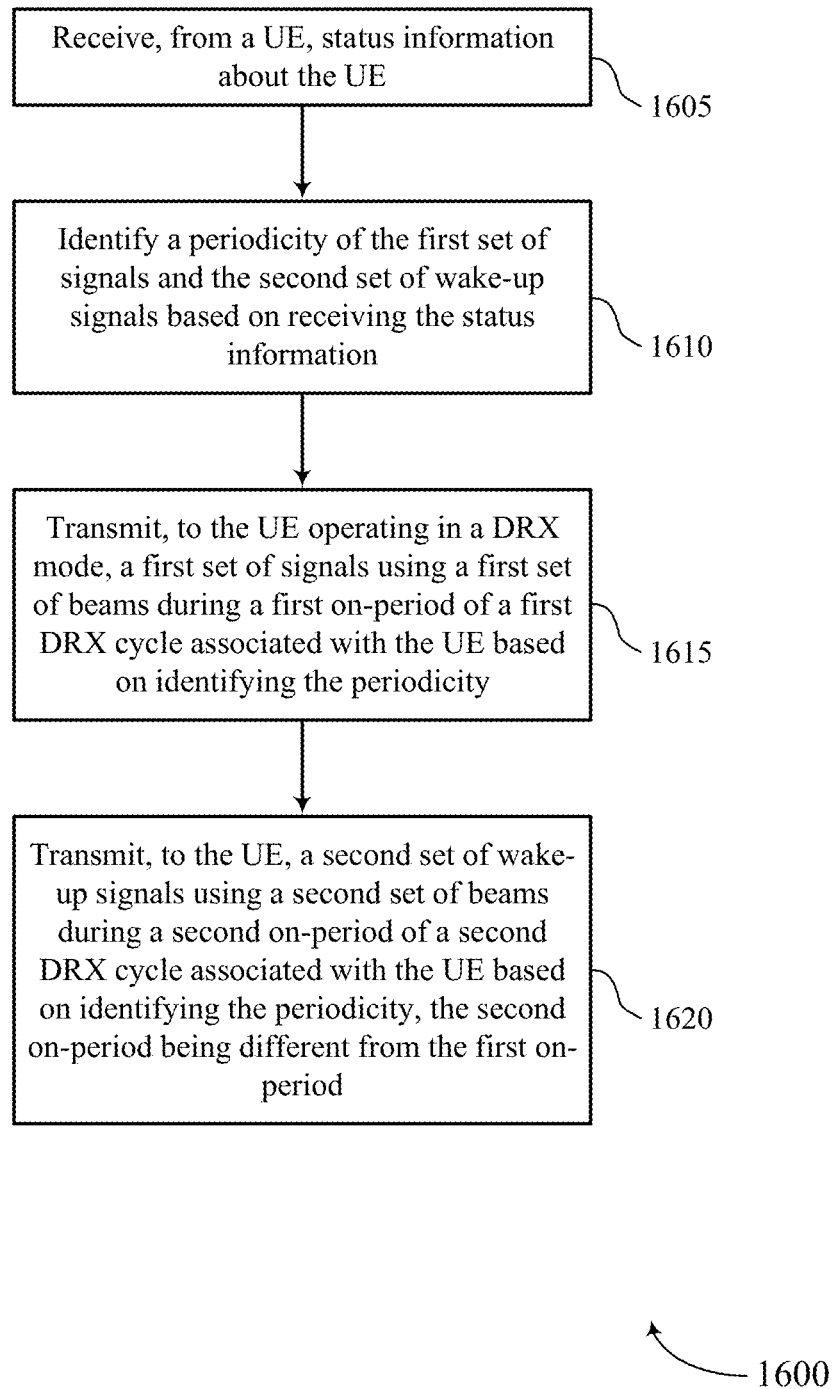

FIG. 16 shows a flowchart illustrating a method 1600 that supports beam sweeping during an on-period of a DRX cycle in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1605, the base station may receive, from a UE operating, status information about the UE. The operations of 1605 may be performed according to the methods described herein. In some examples, aspects of the operations of 1605 may be performed by a status manager as described with reference to FIGS. 11 through 14.

At 1610, the base station may identify a periodicity of the first set of signals and the second set of wake-up signals based on receiving the status information. The operations of 1610 may be performed according to the methods described herein. In some examples, aspects of the operations of 1610 may be performed by a periodicity manager as described with reference to FIGS. 11 through 14.

At 1615, the base station may transmit, to the UE operating in a DRX mode, a first set of signals using a first set of beams during a first on-period of a first DRX cycle associated with the UE based on identifying the periodicity. The operations of 1615 may be performed according to the methods described herein. In some examples, aspects of the operations of 1615 may be performed by a beam management signal manager as described with reference to FIGS. 11 through 14.

At 1620, the base station may transmit, to the UE, a second set of wake-up signals using a second set of beams during a second on-period of a second DRX cycle associated with the UE based on identifying the periodicity, the second on-period being different from the first on-period. The operations of 1620 may be performed according to the methods described herein. In some examples, aspects of the operations of 1620 may be performed by a wake-up signal manager as described with reference to FIGS. 11 through 14.

Figure 17:
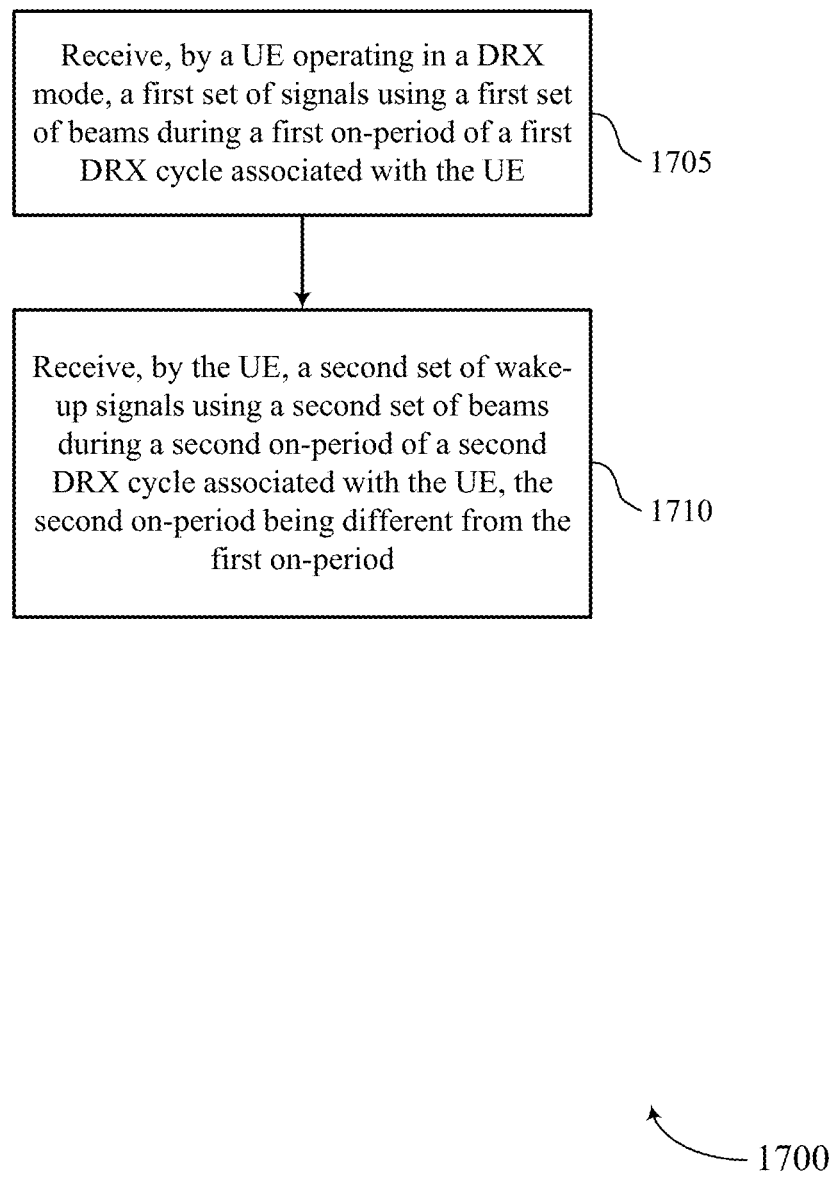

FIG. 17 shows a flowchart illustrating a method 1700 that supports beam sweeping during an on-period of a DRX cycle in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive, by a UE operating in a DRX mode, a first set of signals using a first set of beams during a first on-period of a first DRX cycle associated with the UE. The operations of 1705 may be performed according to the methods described herein. In some examples, aspects of the operations of 1705 may be performed by a beam management signal manager as described with reference to FIGS. 7 through 10.

At 1710, the UE may receive, by the UE, a second set of wake-up signals using a second set of beams during a second on-period of a second DRX cycle associated with the UE, the second on-period being different from the first on-period. The operations of 1710 may be performed according to the methods described herein. In some examples, aspects of the operations of 1710 may be performed by a wake-up signal manager as described with reference to FIGS. 7 through 10.

Figure 18:
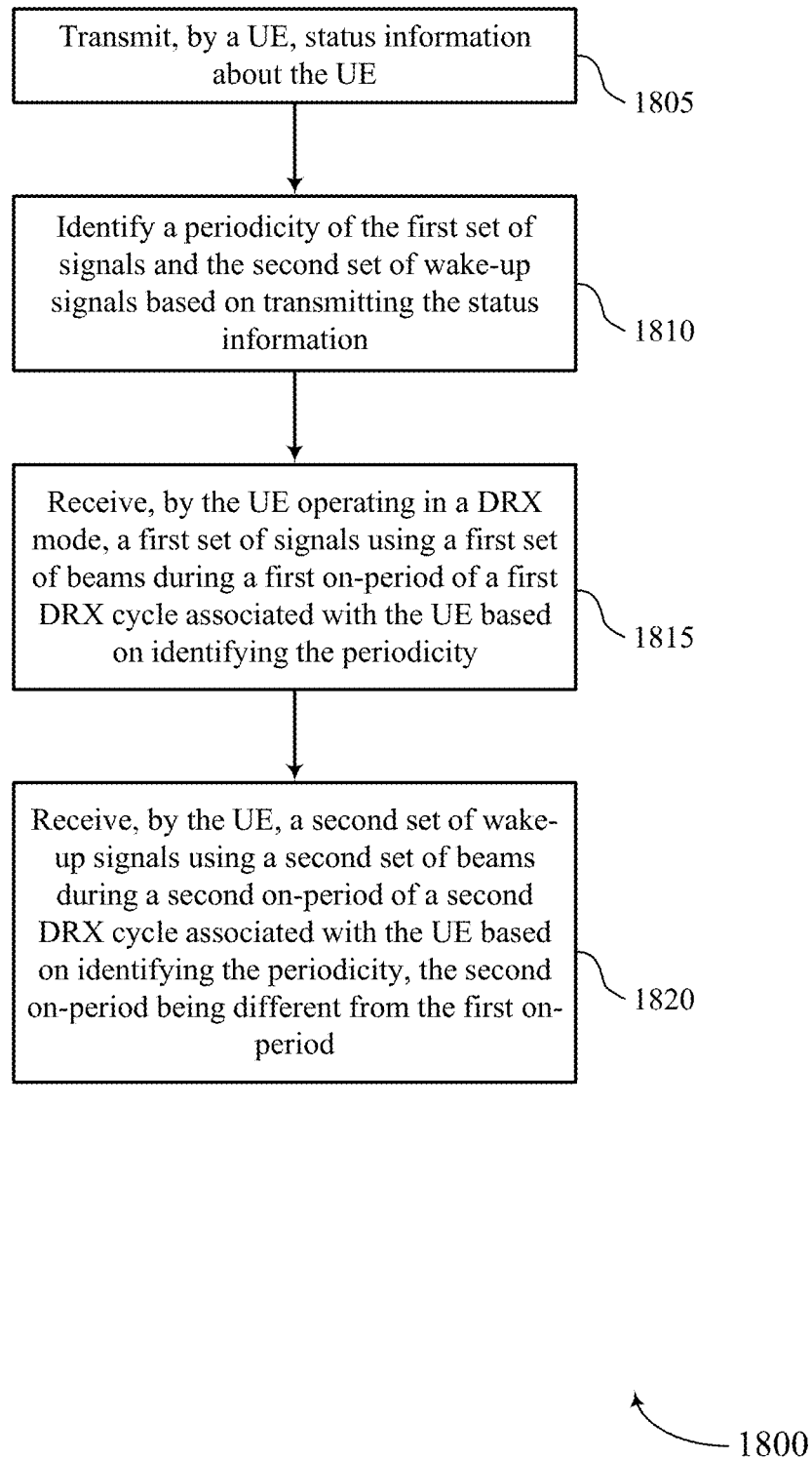

FIG. 18 shows a flowchart illustrating a method 1800 that supports beam sweeping during an on-period of a DRX cycle in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1805, the UE may transmit, by a UE, status information about the UE. The operations of 1805 may be performed according to the methods described herein. In some examples, aspects of the operations of 1805 may be performed by a status manager as described with reference to FIGS. 7 through 10.

At 1810, the UE may identify a periodicity of the first set of signals and the second set of wake-up signals based on transmitting the status information. The operations of 1810 may be performed according to the methods described herein. In some examples, aspects of the operations of 1810 may be performed by a periodicity manager as described with reference to FIGS. 7 through 10.

At 1815, the UE may receive, by the UE operating in a DRX mode, a first set of signals using a first set of beams during a first on-period of a first DRX cycle associated with the UE based on identifying the periodicity. The operations of 1815 may be performed according to the methods described herein. In some examples, aspects of the operations of 1815 may be performed by a beam management signal manager as described with reference to FIGS. 7 through 10.

At 1820, the UE may receive, by the UE, a second set of wake-up signals using a second set of beams during a second on-period of a second DRX cycle associated with the UE based on identifying the periodicity, the second on-period being different from the first on-period. The operations of 1820 may be performed according to the methods described herein. In some examples, aspects of the operations of 1820 may be performed by a wake-up signal manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-orthogonal frequency division multiplexing (Flash-OFDM), etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a network device, signaling that indicates a periodicity of beam sweep procedures performed during off-periods of discontinuous reception (DRX) cycles associated with a DRX mode;
   monitoring, while operating in the DRX mode, for a first set of wake-up signals transmitted by the network device using a first set of beams during a first on-period of a first DRX cycle, the first set of beams selected as part of a first beam sweep procedure performed during a first off-period of the first DRX cycle in accordance with the indicated periodicity; and
   monitoring, while operating in the DRX mode, for a second set of wake-up signals transmitted by the network device using the first set of beams during a second on-period of a second DRX cycle based at least in part on the indicated periodicity.

2. The method of claim 1, further comprising:
   transmitting, to the network device, status information indicating one or more operating parameters of the UE, wherein the indicated periodicity is based at least in part on the status information.

3. The method of claim 1, further comprising:
   comparing the indicated periodicity to an index of the second DRX cycle, wherein monitoring for the second set of wake-up signals using the first set of beams during the second on-period of the second DRX cycle is based at least in part on comparing the indicated periodicity to the index of the second DRX cycle.

4. The method of claim 1, further comprising:
   refraining from performing a second beam sweep procedure during a second off-period of the second DRX cycle based at least in part on the indicated periodicity.

5. The method of claim 4, wherein the second off-period of the second DRX cycle is between the first on-period of the first DRX cycle and the second on-period of the second DRX cycle in time.

6. The method of claim 1, wherein the signaling indicates a second periodicity of beam sweep procedures performed during on-periods of the DRX cycles associated with the DRX mode, the method comprising:
   performing, while operating in the DRX mode, a second beam sweep procedure during a third on-period of a third DRX cycle in accordance with the indicated second periodicity.

7. The method of claim 6, wherein performing a beam sweep procedure in accordance with the indicated second periodicity occurs once in every N DRX on-periods, wherein N is an integer that is two or more.

8. The method of claim 7, wherein monitoring for wake-up signals transmitted by the network device during on-periods of the DRX cycles occurs during non-N on-periods of the DRX cycles.

9. The method of claim 6, further comprising:
   receiving a set of signals during the third on-period of the third DRX cycle in accordance with the indicated second periodicity, wherein performing the second beam sweep procedure is based at least in part on receiving the set of signals.

10. The method of claim 9, further comprising:
    identifying wake-up information encoded in at least one reference signal of the set of signals transmitted during the third on-period of the third DRX cycle.

11. The method of claim 9, wherein the set of signals comprises a physical downlink control channel (PDCCH) with one or more cyclic redundancy check (CRC) bits scrambled using a radio network temporary identifier (RNTI) associated with the UE.

12. The method of claim 9, wherein the set of signals comprises channel state information reference signals (CSI-RSs), primary synchronization signals (PSSs), secondary synchronization signals (SSSs), demodulation reference signals (DMRSs) of physical broadcast channels (PBCHs), or tracking reference signals, or a combination thereof.

13. The method of claim 6, further comprising:
    monitoring, using a second set of beams selected as part of the second beam sweep procedure, for a third set of wake-up signals during a fourth on-period of a fourth DRX cycle based at least in part on performing the second beam sweep procedure during the third on-period of the third DRX cycle.

14. A method for wireless communication at a network device, comprising:
    transmitting signaling that indicates a periodicity of beam sweep procedures performed during off-periods of discontinuous reception (DRX) cycles associated with a DRX mode for a user equipment (UE);
    transmitting, in accordance with the DRX mode, a first set of wake-up signals using a first set of beams during a first on-period of a first DRX cycle, the first set of beams selected as part of a first beam sweep procedure performed during a first off-period of the first DRX cycle in accordance with the indicated periodicity; and
    transmitting, in accordance with the DRX mode, a second set of wake-up signals using the first set of beams during a second on-period of a second DRX cycle based at least in part on the indicated periodicity.

15. The method of claim 14, further comprising:
receiving status information indicating one or more operating parameters of the UE, wherein the indicated periodicity is based at least in part on the status information.

16. The method of claim 14, further comprising:
comparing the indicated periodicity to an index of the second DRX cycle, wherein transmitting the second set of wake-up signals using the first set of beams during the second on-period of the second DRX cycle is based at least in part on comparing the indicated periodicity to the index of the second DRX cycle.

17. The method of claim 14, further comprising:
refraining from performing a second beam sweep procedure during a second off- period of the second DRX cycle based at least in part on the indicated periodicity.

18. The method of claim 16, wherein the second off-period of the second DRX cycle is between the first on-period of the first DRX cycle and the second on-period of the second DRX cycle in time.

19. The method of claim 14, wherein the signaling indicates a second periodicity of beam sweep procedures performed during on-periods of the DRX cycles associated with the DRX mode, the method comprising:
performing a second beam sweep procedure during a third on-period of a third DRX cycle in accordance with the indicated second periodicity.

20. The method of claim 19, wherein performing a beam sweep procedure in accordance with the indicated second periodicity occurs once in every N DRX on-periods, wherein N is an integer that is two or more.

21. The method of claim 20, wherein transmitting wake-up signals during on-periods of the DRX cycles occurs during non-N on-periods of the DRX cycles.

22. The method of claim 19, further comprising:
transmitting a set of signals during the third on-period of the third DRX cycle in accordance with the indicated second periodicity, wherein performing the second beam sweep procedure is based at least in part on transmitting the set of signals.

23. The method of claim 22, further comprising:
encoding wake-up information in at least one reference signal of the set of signals transmitted during the third on-period of the third DRX cycle.

24. The method of claim 22, wherein the set of signals comprises a physical downlink control channel (PDCCH) with one or more cyclic redundancy check (CRC) bits scrambled using a radio network temporary identifier (RNTI) associated with the UE.

25. The method of claim 22, wherein the set of signals comprises channel state information reference signals (CSI-RSs), primary synchronization signals (PSSs), secondary synchronization signals (SSSs), demodulation reference signals (DMRSs) of physical broadcast channels (PBCHs), or tracking reference signals, or a combination thereof.

26. The method of claim 19, further comprising:
transmitting, using a second set of beams selected as part of the second beam sweep procedure, a third set of wake-up signals during a fourth on-period of a fourth DRX cycle based at least in part on performing the second beam sweep procedure during the third on-period of the third DRX cycle.

27. An apparatus for wireless communications at a user equipment (UE), comprising:
one or more processors,
one or more memories coupled with the one or more processors; and
instructions stored in the memory and executable by the one or more processors to cause the apparatus to:
receive, from a network device, signaling that indicates a periodicity of beam sweep procedures performed during off-periods of discontinuous reception (DRX) cycles associated with a DRX mode;
monitor, while operating in the DRX mode, for a first set of wake-up signals transmitted by the network device using a first set of beams during a first on-period of a first DRX cycle, the first set of beams selected as part of a first beam sweep procedure performed during a first off-period of the first DRX cycle in accordance with the indicated periodicity; and
monitor, while operating in the DRX mode, for a second set of wake-up signals transmitted by the network device using the first set of beams during a second on-period of a second DRX cycle based at least in part on the indicated periodicity.

28. The apparatus of claim 27, wherein the instructions are further executable by the one or more processors to cause the apparatus to:
transmit, to the network device, status information about the UE, wherein the indicated periodicity is based at least in part on the status information.

29. The apparatus of claim 27, wherein the instructions are further executable by the one or more processors to cause the apparatus to:
compare the indicated periodicity to an index of the second DRX cycle, wherein monitoring for the second set of wake-up signals using the first set of beams during the second on-period of the second DRX cycle is based at least in part on comparing the indicated periodicity to the index of the second DRX cycle.

30. An apparatus for wireless communications at a network device, comprising:
one or more processors,
one or more memories coupled with the one or more processors; and
instructions stored in the memory and executable by the processor one or more processors to cause the apparatus to:
transmit signaling that indicates a periodicity of beam sweep procedures performed during off-periods of discontinuous reception (DRX) cycles associated with a DRX mode for a user equipment (UE);
transmit, in accordance with the DRX mode, a first set of wake-up signals using a first set of beams during a first on-period of a first DRX cycle, the first set of beams selected as part of a first beam sweep procedure performed during a first off-period of the first DRX cycle in accordance with the indicated periodicity; and
transmit, in accordance with the DRX mode, a second set of wake-up signals using the first set of beams during a second on-period of a second DRX cycle based at least in part on the indicated periodicity.

* * * * *